United States Patent
Kikuchi

(10) Patent No.: US 10,518,745 B2
(45) Date of Patent: Dec. 31, 2019

(54) LOCKING DEVICE

(71) Applicant: MITSUMI ELECTRIC CO., LTD., Tokyo (JP)

(72) Inventor: Kazunori Kikuchi, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 61 days.

(21) Appl. No.: 15/908,240

(22) Filed: Feb. 28, 2018

(65) Prior Publication Data
US 2018/0361987 A1    Dec. 20, 2018

(30) Foreign Application Priority Data

Jun. 15, 2017    (JP) .................................. 2017-118133

(51) Int. Cl.
*B60R 22/48*    (2006.01)
*A44B 11/25*    (2006.01)

(52) U.S. Cl.
CPC .......... *B60R 22/48* (2013.01); *A44B 11/2526* (2013.01); *A44B 11/2561* (2013.01);
(Continued)

(58) Field of Classification Search
CPC ............ B60R 22/48; B60R 2022/4816; B60R 2022/4866; A44B 11/2523;
(Continued)

(56) References Cited

U.S. PATENT DOCUMENTS 4,754,105 A * 6/1988 Doty .................. A44B 11/2523
                                               200/61.58 B
5,522,619 A * 6/1996 Collins .............. A44B 11/2503
                                                      24/633
(Continued)

FOREIGN PATENT DOCUMENTS

JP    2015000592 A    1/2015
WO   2014199750 A1   12/2014

OTHER PUBLICATIONS

European Search Report, EP18159580.2, dated Sep. 18, 2018, 7 pages.

*Primary Examiner* — Robert Sandy
*Assistant Examiner* — Louis A Mercado
(74) *Attorney, Agent, or Firm* — Miller Nash Graham & Dunn LLP

(57) ABSTRACT

A locking device 1 includes a main body 2, a locking member 3 for locking a tongue 200, a lock releasing operation member 22 operated for releasing the lock of the tongue 200, a tongue guiding and discharging member 41 slid along an insertion direction of the tongue 200 in the main body 2 to guide the tongue 200 until the locking member 3 locks the tongue 200 and discharge the tongue 200 from the main body 2 when the lock of the tongue 200 is released, a power generator 5 having an operation member 53 pushed by the tongue guiding and discharging member 41 and pivotally moved in a plane parallel to the insertion direction of the tongue 200 when the tongue 200 is inserted into the main body 2 and generating electric power by utilizing external force applied through the operation member 53 and a wireless transmitting part 7 driven by the electric power generated by the power generator 5.

11 Claims, 17 Drawing Sheets

(52) U.S. Cl.
CPC ... *A44B 11/2569* (2013.01); *B60R 2022/4816* (2013.01); *B60R 2022/4866* (2013.01)

(58) Field of Classification Search
CPC ............ A44B 11/2569; A44B 11/2561; A44B 11/2526; A44B 11/2573; H01H 27/00; H02K 7/1807
See application file for complete search history.

(56) References Cited

U.S. PATENT DOCUMENTS

| | | | | |
|---|---|---|---|---|
| 6,868,745 | B2* | 3/2005 | Sullivan | ................ B60R 22/48 |
| | | | | 73/862.391 |
| 7,031,230 | B1 | 4/2006 | Nagasaka et al. | |
| 7,657,979 | B2* | 2/2010 | Midorikawa | ........... B60R 22/48 |
| | | | | 24/633 |
| 7,852,068 | B2* | 12/2010 | Kircher | ................ B60R 22/48 |
| | | | | 180/268 |
| 8,375,530 | B2* | 2/2013 | Walega | .............. A44B 11/2523 |
| | | | | 180/268 |
| 9,635,909 | B2* | 5/2017 | Clark | ................ A44B 11/2526 |
| 2006/0290130 | A1* | 12/2006 | Hall | ................ B60R 21/01546 |
| | | | | 280/801.1 |
| 2009/0243892 | A1* | 10/2009 | Cheung | .............. A44B 11/2569 |
| | | | | 340/945 |
| 2017/0332742 | A1* | 11/2017 | Moran | .............. A44B 11/2519 |
| 2019/0256041 | A1* | 8/2019 | Tinoco | ................ B60R 22/48 |

\* cited by examiner

Initial state

Engagement

Engagement is released and
first power generation is started

First power generation finishes

First power generation finishes

Re-engagement

Engagement is released and
second power generation is started

Second power generation finishes

LOCKING DEVICE

CROSS REFERENCE TO RELATED APPLICATION

This application claims priority to and the benefit of Japanese Patent Application No. 2017-118133 filed on Jun. 15, 2017, which is incorporated herein in its entirety.

TECHNICAL FIELD

The present invention generally relates to locking devices for locking a tongue, in particular to a locking device including a power generator which can generate electric power at the time of inserting and discharging a tongue and a wireless transmitting part driven by the electric power generated by the power generator.

BACKGROUND

For the purpose of fixing an arbitrary object with a belt, a tongue through which the belt is inserted and a locking device for locking the tongue are typically used. This combination of the tongue through which the belt is inserted and the locking device for locking the tongue can be used for fixing various objects with the belt. For example, this combination is widely used for fixing a cargo such as a container, an opening and closing box, a door of a shelf, a passenger in a vehicle and the like.

Such a belt fixing method using the combination of the tongue through which the belt is inserted and the locking device has significantly high reliability. Thus, in order to ensure safety when a specific object is transported, there is a case where it is obligated to fix the specific object with the belt. For example, in a case where a passenger is transported by a vehicle or an airplane, the tongue through which the belt is inserted and the locking device for locking the tongue are provided at a seat and the passenger must fix himself/herself to the seat with the belt during driving of the vehicle or during takeoff and landing of the airplane. Further, in a case where a cargo such as a container is transported by an airplane or a ship, it is required to fix the cargo to a floor, a wall or the like of the airplane or the ship with the tongue through which the belt is inserted and the locking device for locking the tongue during operation of the airplane or the ship.

As described above, the belt fixing method using the combination of the tongue through which the belt is inserted and the locking device for locking the tongue is significantly important for ensuring the safety. Thus, for example, in the case where the passenger is transported by the vehicle or the airplane, a responsible person (such as a driver of the vehicle or a flight attendant of the airplane) in charge of ensuring the safety for the passenger needs to visually check whether or not the passenger is fixed to the seat with the tongue through which the belt is inserted and the locking device for locking the tongue. Further, in the case where the cargo such as a container is transported by the airplane or the ship, a responsible person in charge of ensuring the safety for the operation of the airplane or the ship needs to visually check whether or not the cargo is fixed to the floor, the wall or the like of the airplane or the ship with the tongue through which the belt is inserted and the locking device for locking the tongue.

Such a safety-check operation is visually performed. Thus, in a case where the number of objects to be fixed (such as passengers, cargos, opening and closing boxes and doors) is large, the safety-check operation requires huge manpower. Further, the visual check is likely to cause human errors such as overlooking of a non-fixed state and there is a possibility that such human errors lead to a serious accident.

In order to solve this problem, patent document 1 discloses a seat-belt wearing informing system using a locking device 920 for locking a tongue 910 as shown in FIG. 1. The seat-belt wearing informing system of the patent document 1 is used for informing wearing of a seat-belt of a passenger in a vehicle. The seat-belt (not shown in the drawing) is inserted through the tongue 910 and the passenger inserts the tongue 910 into the locking device 920 and locks the tongue 910 in a state that the passenger is in a sitting position on a seat to fix himself/herself to the seat.

The locking device 920 includes a lever 930 pivotally moved in a plane perpendicular to an insertion direction of the tongue 910 when the tongue 910 is inserted into the locking device 920, a power generator 940 fixedly provided in the locking device 920 and a wireless transmitting part (not shown in the drawing) driven by electric power generated by the power generator 940.

When the tongue 910 is inserted into the locking device 920, a pushing member 921 in the locking device 920 is pushed in the insertion direction of the tongue 910 by the tongue 910 and makes contact with the lever 930. When the tongue 910 is further inserted in this state, the lever 930 is pushed by the pushing member 921, and thereby the lever 930 is pivotally moved in the plane perpendicular to the insertion direction of the tongue 910. When the lever 930 is pivotally moved, the lever 930 makes contact with a button 950 of the power generator 940 and the button 950 is pushed by the lever 930. As a result, power generation of the power generator 940 is performed. After that, the wireless transmitting part of the locking device 920 is driven by the electric power generated by the power generator 940 and then a signal for informing an event that the tongue 910 is locked, that is an event that the passenger wears the seat-belt is wirelessly transmitted to a management device such as a server, a personal computer and a mobile device. Further, the power generation of the power generator 940 is again performed when the lock of the tongue 910 is released and the tongue 910 is discharged from the locking device 920. At this time, the wireless transmitting part is again driven by the electric power generated by the power generator 940 and a signal informing an event that the lock of the tongue 910 is released and the tongue 910 is discharged from the locking device 920, that is an event that the seat-belt is released is wirelessly transmitted to the management device.

The responsible person in charge of ensuring the safety can check a fixed state of each of the objects to be fixed by referring to the management device. With this configuration, it becomes unnecessary to visually check the fixed states of the objects to be fixed one by one, and thereby the manpower required for the safety-check operation is significantly reduced. Further, since the fixed state of each of the objects to be fixed is determined based on the signal wirelessly transmitted from the wireless transmitting part of the locking device 920, the human errors such as the overlooking of unfixed states of the objects to be fixed do not occur unlike the case of visually performing the safety-check operation.

As described above, in the locking device 920 of the patent document 1, when the tongue 910 is inserted into the locking device 920, the lever 930 is pushed by the pushing member 921 and pivotally moved in the plane perpendicular to the insertion direction of the tongue 910. After that, the button 950 of the power generator 940 is pushed due to the pivotal movement of the lever 930, and thereby the power generation of the power generator 940 is performed.

As described above, in the locking device 920 of the patent document 1, the horizontal movement in the insertion direction of the tongue 910 is converted into the pivotal movement in the plane perpendicular to the insertion direction of the tongue 910 through the lever 930. Thus, the locking device 920 of the patent document 1 needs to internally ensure a space for performing the pivotal movement of the lever 930 in the plane perpendicular to the insertion direction of the tongue 910. Therefore, there is a problem that a thickness of the locking device 920 increases. Further, in order to perform this conversion from the horizontal movement in the insertion direction of the tongue 910 to the pivotal movement of the lever 930 in the plane perpendicular to the insertion direction of the tongue 910 as described above, the number of assemblies of the locking device 920 increases and a configuration of the locking device 920 becomes complicated. Thus, there is a problem that a cost of the locking device 920 increases.

SUMMARY

The present invention has been made in view of the conventional problems mentioned above. Accordingly, it is an object of the present invention to reduce a thickness of a locking device including a power generator which can generate electric power at the time of inserting and discharging a tongue and a wireless transmitting part driven by the electric power generated by the power generator and reduce the number of assemblies of the locking device, thereby simplifying a configuration of the locking device and reducing a cost of the locking device.

The above object is achieved by the present inventions defined in the following (1) to (11).

(1) A locking device for locking a tongue, comprising:
a main body having a tongue insertion port through which the tongue is inserted;
a locking member for locking the tongue when the tongue reaches a predetermined position in the main body;
a lock releasing operation member operated for releasing the lock of the tongue due to the locking member;
a tongue guiding and discharging member provided in the main body so as to be slidably moved along an insertion direction of the tongue, wherein the tongue guiding and discharging member is slid along the insertion direction of the tongue in the main body to guide the tongue until the locking member locks the tongue when the tongue is inserted into the main body through the tongue insertion port and discharge the tongue from the main body when the lock of the tongue due to the locking member is released;
a power generator fixedly provided in the main body, wherein the power generator has an operation member pushed by the tongue guiding and discharging member slid in the main body along the insertion direction of the tongue and pivotally moved in a plane parallel to the insertion direction of the tongue when the tongue is inserted into the main body, and wherein the power generator generates electric power by utilizing external force applied from the tongue guiding and discharging member through the operation member; and
a wireless transmitting part driven by the electric power generated by the power generator.

(2) The locking device according to the above (1), wherein the operation member of the power generator is pushed by the tongue guiding and discharging member and pivotally moved from a predetermined initial position in a first direction in the plane parallel to the insertion direction of the tongue when the tongue is inserted into the main body, and
wherein the operation member of the power generator is pivotally moved in a second direction opposite to the first direction in the plane parallel to the insertion direction of the tongue to return to the predetermined initial position when the lock of the tongue due to the locking member is released and the tongue is discharged from the main body.

(3) The locking device according to the above (2), wherein the power generator performs first power generation when the tongue is inserted into the main body and the locking member locks the tongue and performs second power generation when the lock of the tongue due to the locking member is released and the operation member of the power generator is pivotally moved in the second direction in the plane parallel to the insertion direction of the tongue to return to the predetermined initial position.

(4) The locking device according to the above (3), wherein positive and negative of an electromotive voltage generated in the power generator at the first power generation are different from positive and negative of an electromotive voltage generated in the power generator at the second power generation.

(5) The locking device according to any one of the above (1) to (4), wherein the tongue guiding and discharging member has a plate-like engagement portion to be engaged with the tongue and a contact portion formed so as to protrude from an upper surface of the engagement portion,
wherein the contact portion pushes the operation member of the power generator to pivotally move the operation member in the plane parallel to the insertion direction of the tongue when the tongue is inserted into the main body and the tongue guiding and discharging member is slid in the main body along the insertion direction of the tongue.

(6) The locking device according to any one of the above (1) to (5), wherein the power generator further has a coil, a magnet provided so as to be relatively rotated and moved with respect to the coil around a predetermined rotational axis and an elastic member for storing the external force applied from the tongue guiding and discharging member through the operation member as elastic energy and releasing the stored elastic energy to relatively rotate and move the magnet with respect to the coil.

(7) The locking device according to the above (6), wherein the power generator further has a rotating member which is engaged with the operation member and can be rotated due to pivotal movement of the operation member, and
wherein the magnet is attached to the rotating member.

(8) The locking device according to the above (7), wherein the operation member is configured to be engaged with the rotating member while the magnet is rotated and moved to reach a first engagement release position due to rotation of the rotating member and release engagement with the rotating member when the magnet reaches the first engagement release position, and
wherein the elastic member is configured to store the elastic energy while the magnet is rotated and moved due to the rotation of the rotating member and release the elastic energy to rotate and move the magnet when the engagement between the operation member and the rotating member is released for allowing the power generator to perform first power generation.

(9) The locking device according to the above (8), wherein the operation member can be pivotally moved to return to a predetermined initial position when the lock of the tongue due to the locking member is released after the engagement between the operation member and the rotating member is released.

(10) The locking device according to the above (9), wherein the operation member is configured to again engage with the rotating member to rotate and move the rotating member when the operation member is pivotally moved so as to return to the predetermined initial position, and wherein the operation member is configured to be engaged with the rotating member while the magnet is rotated and moved due to the rotation of the rotating member to reach a second engagement release position and again release the engagement with the rotating member when the magnet reaches the second engagement release position.

(11) The locking device according to the above (10), wherein the elastic member is configured to store the elastic energy while the operation member is pivotally moved so as to return to the predetermined initial position and the magnet is rotated and moved due to the rotation of the rotating member and release the elastic energy when the engagement between the operation member and the rotating member is again released to rotate and move the magnet for allowing the power generator to perform second power generation.

Effects of the Embodiments

In the locking device of the present invention, the operation member of the power generator is pivotally moved in the plane parallel to the insertion direction of the tongue by utilizing the horizontal movement caused by insertion of the tongue into the main body of the locking device for performing the power generation of the power generator and driving the wireless transmitting part with the electric power generated by the power generator. Thus, unlike the above-mentioned conventional art, it becomes necessary to ensure a space for converting the horizontal movement caused by the insertion of the tongue into the main body of the locking device into pivotal movement in a plane perpendicular to the insertion direction of the tongue. Thus, it is possible to reduce a thickness of the locking device.

Further, in the locking device of the present invention, additional assemblies are not required for pivotally moving the operation member of the power generator by utilizing the horizontal movement caused by the insertion of the tongue into the main body of the locking device unlike the above-mentioned conventional art. Thus, the number of assemblies does not increase in the locking device of the present invention for pivotally moving the operation member of the power generator. Therefore, it is possible to simplify the configuration of the locking device and reduce a cost of the locking device.

DETAILED DESCRIPTION OF THE PREFERRED EMBODIMENTS

Hereinafter, description will be given to a locking device of the present invention based on a preferred embodiment shown in the accompanying drawings. First, a configuration of the locking device of the present invention will be described in detail with reference to FIGS. 2 to 11.

Figure 1:
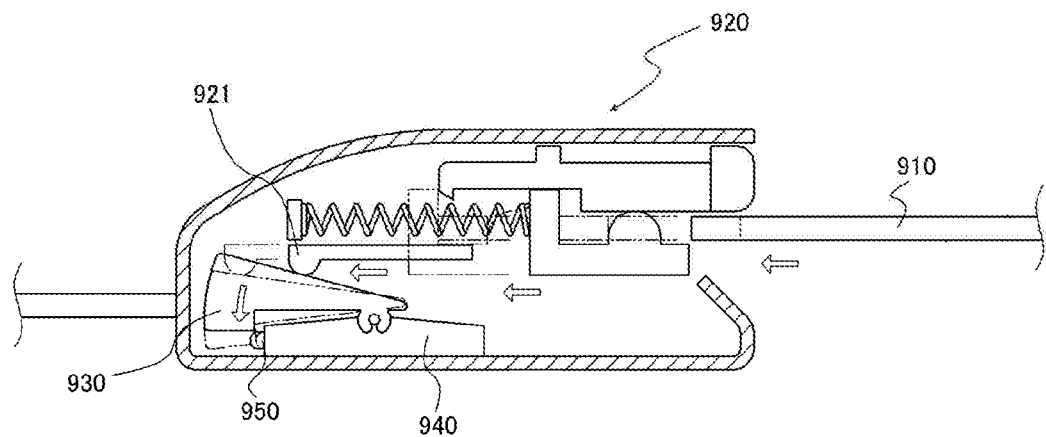
FIG. 1 is a view for explaining a configuration of a conventional locking device.
Figure 2:
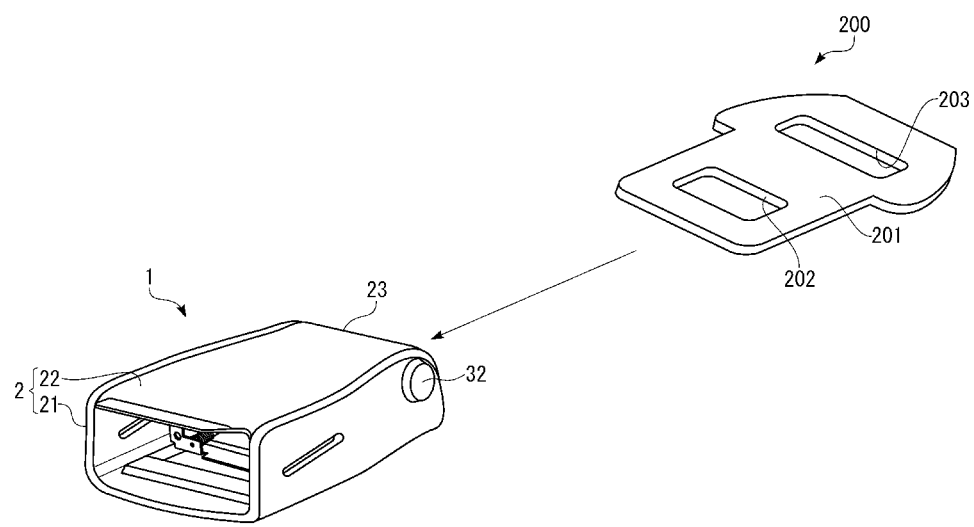
FIG. 2 is a perspective view showing a tongue and a locking device according to an embodiment of the present invention.
Figure 3:
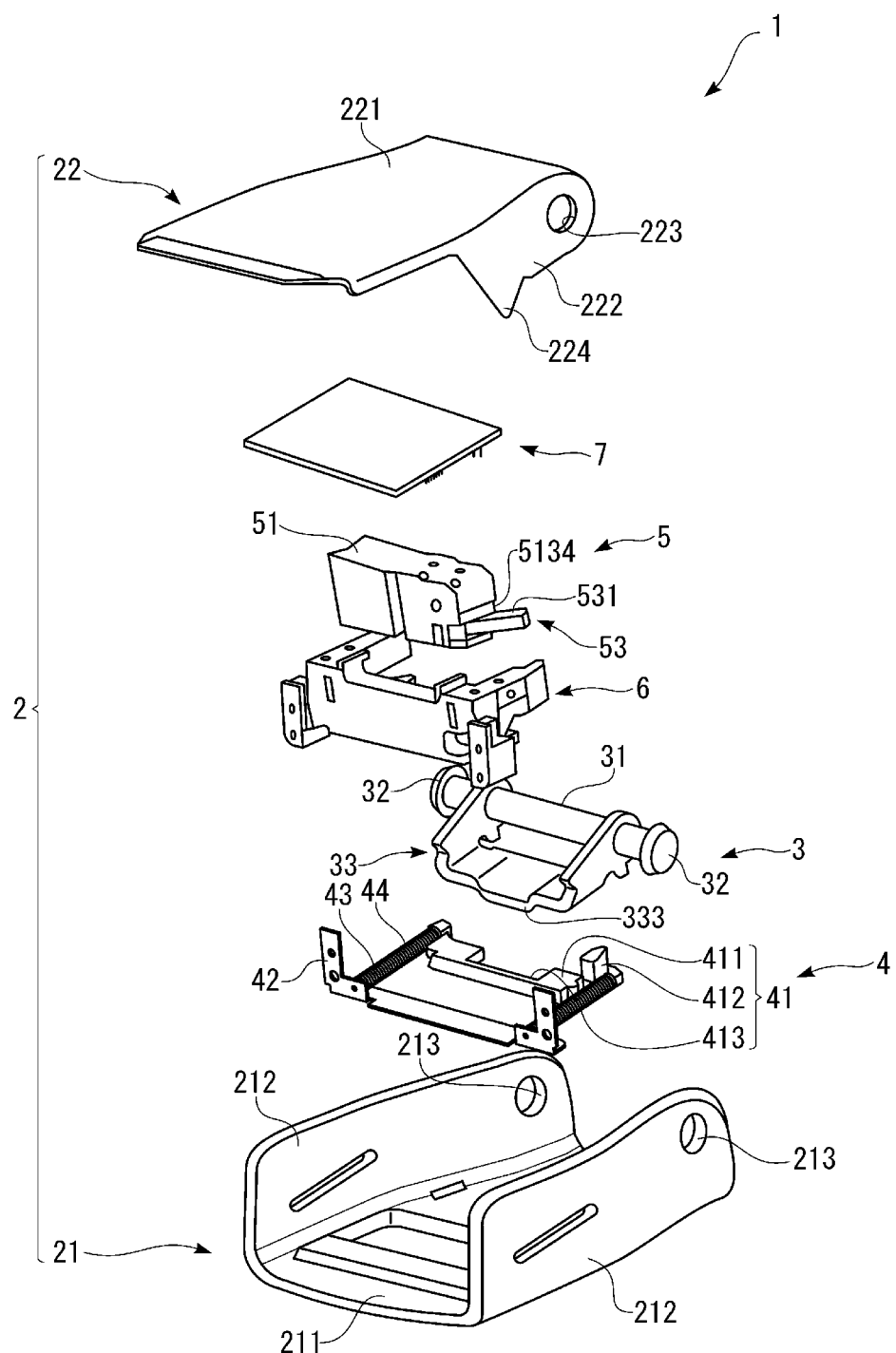
FIG. 3 is an exploded perspective view of the locking device shown in FIG. 2.
Figure 4:
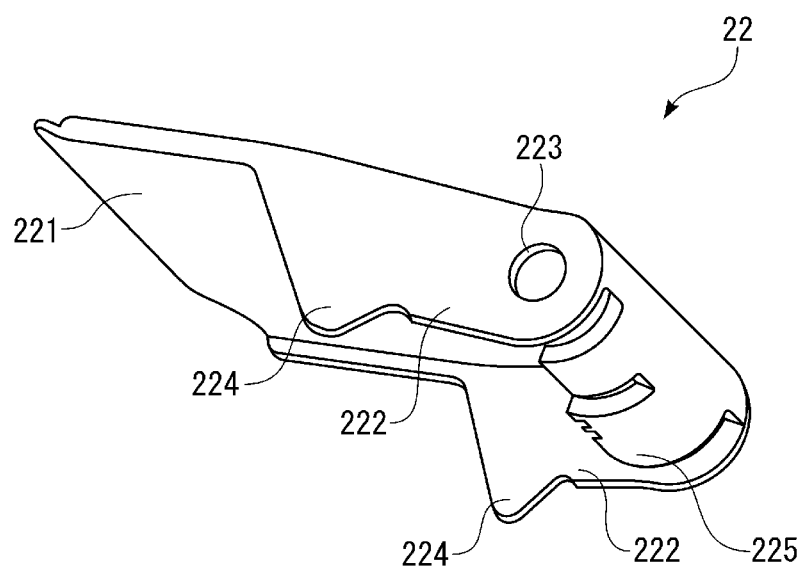
FIG. 4 is a perspective view of a lock releasing operation member of the locking device shown in FIG. 2.
Figure 5:
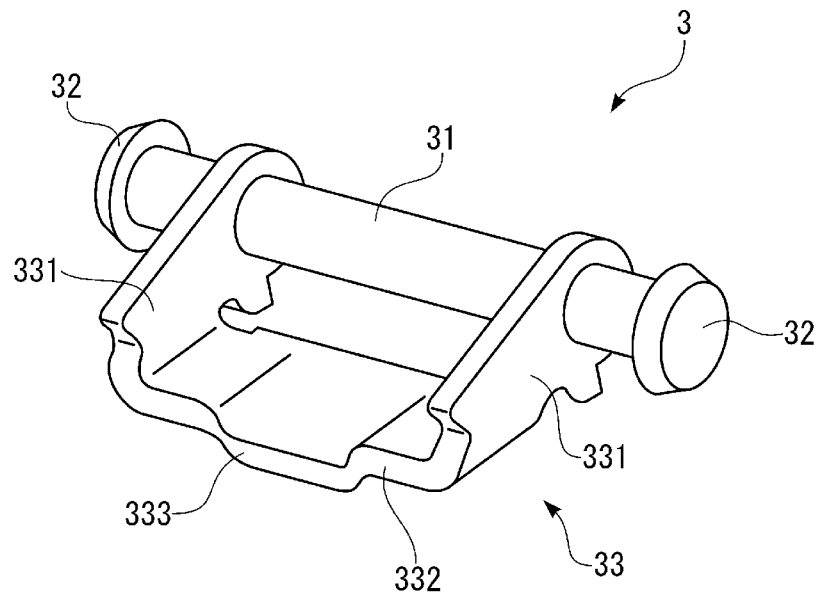
FIG. 5 is a perspective view of a locking member of the locking device shown in FIG. 2.
Figure 6:
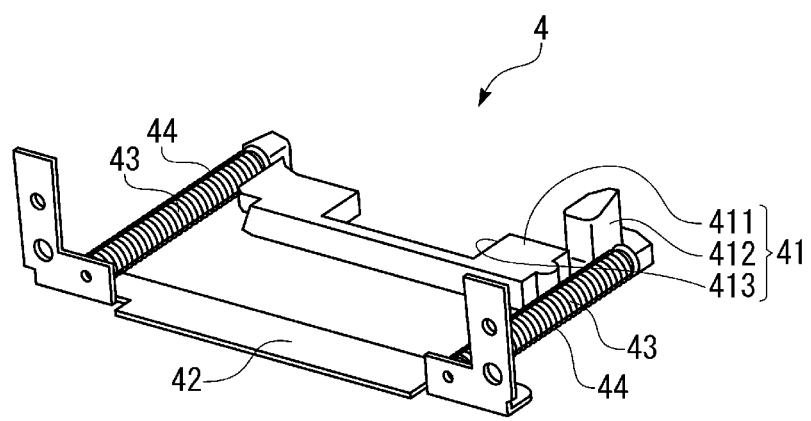
FIG. 6 is a perspective view of a tongue guiding and discharging mechanism of the locking device shown in FIG. 2.
Figure 7:
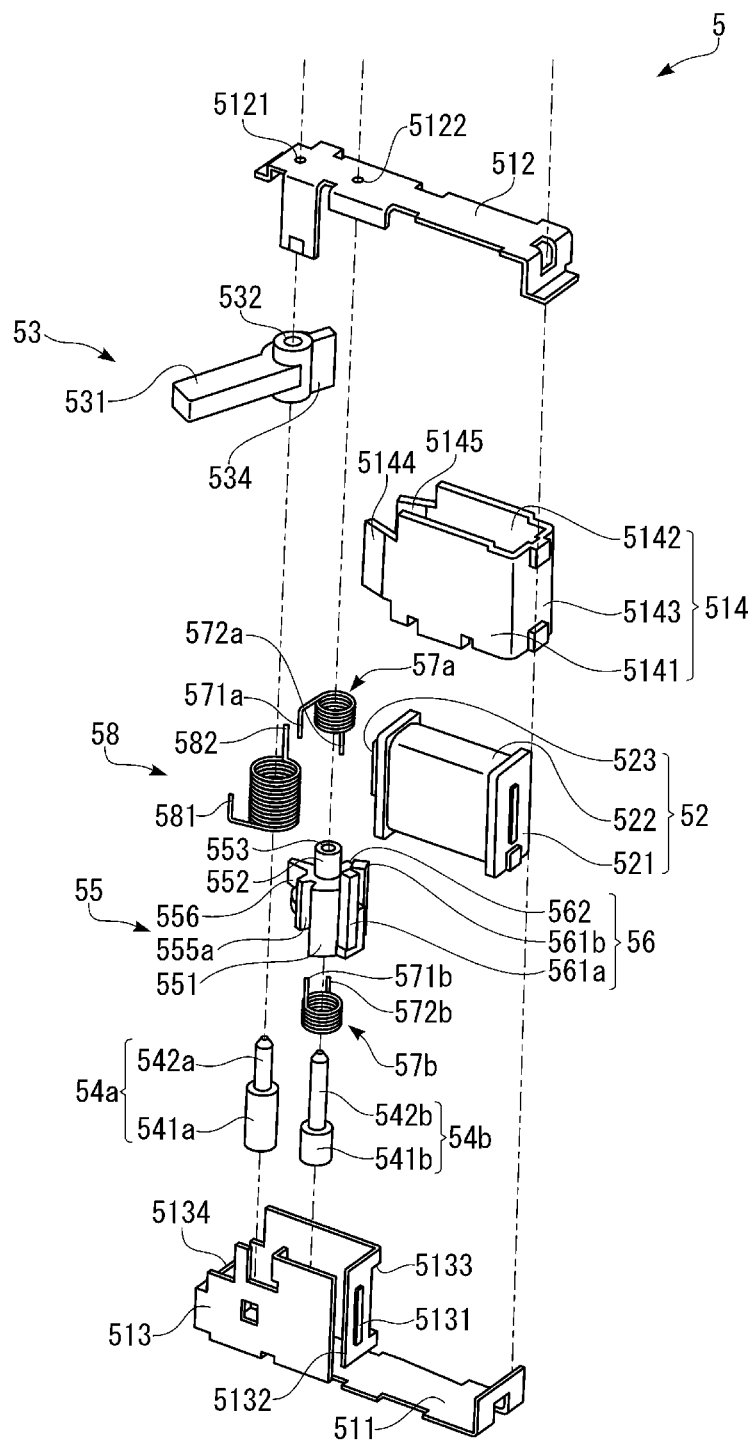
FIG. 7 is an exploded perspective view of a power generator of the locking device shown in FIG. 2.
Figure 8:
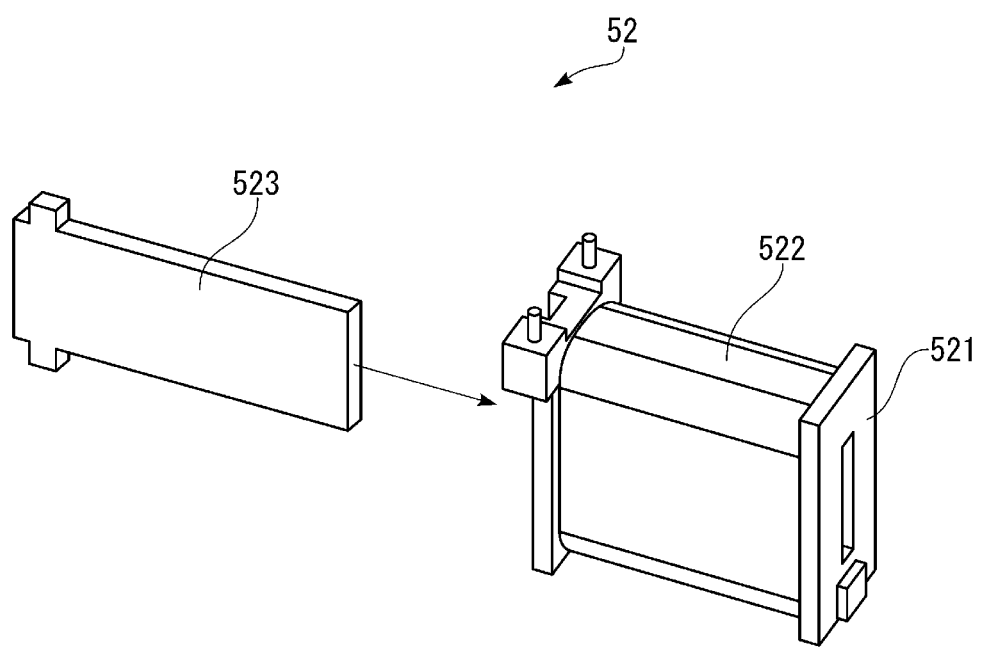
FIG. 8 is a view showing a coil assembly of the power generator shown in FIG. 7.
Figure 9:
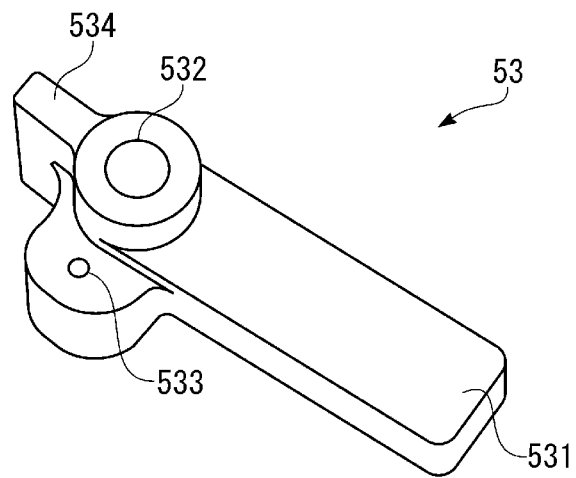
FIG. 9 is a view showing an operation member of the power generator shown in FIG. 7.
Figure 10:
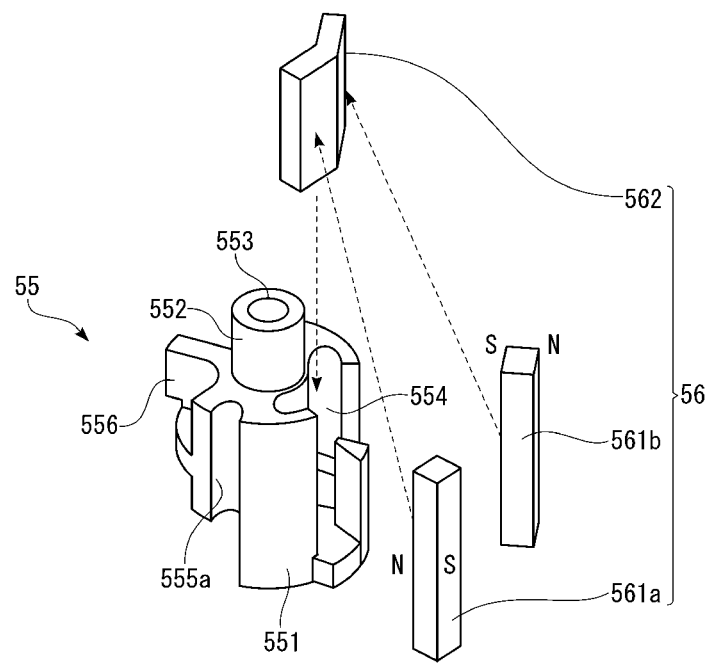
FIG. 10 is a view showing a rotating member and a magnet assembly of the power generator shown in FIG. 7.
Figure 11:
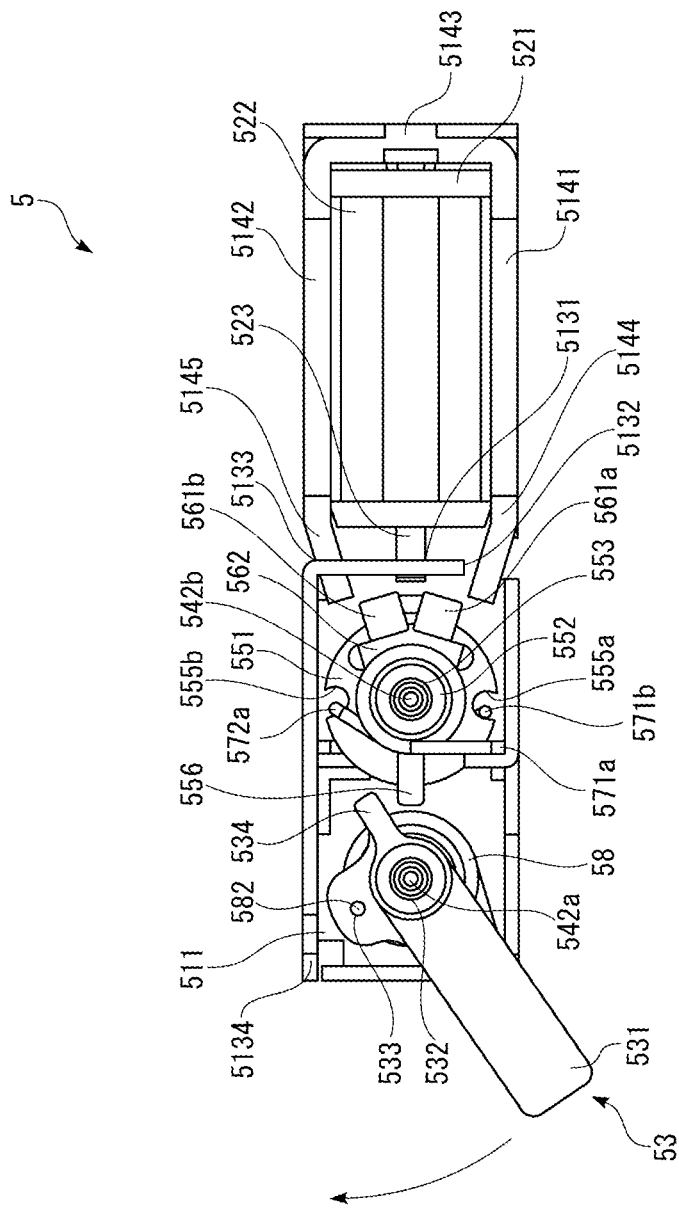
FIG. 11 is a top view showing an internal configuration of the power generator shown in FIG. 7.

FIG. 2 is a perspective view showing a tongue and the locking device according to the embodiment of the present invention. FIG. 3 is an exploded perspective view of the locking device shown in FIG. 2. FIG. 4 is a perspective view of a lock releasing operation member of the locking device shown in FIG. 2. FIG. 5 is a perspective view of a locking member of the locking device shown in FIG. 2. FIG. 6 is a perspective view of a tongue guiding and discharging mechanism of the locking device shown in FIG. 2. FIG. 7 is an exploded perspective view of a power generator of the locking device shown in FIG. 2. FIG. 8 is a view showing a coil assembly of the power generator shown in FIG. 7. FIG. 9 is a view showing an operation member of the power generator shown in FIG. 7. FIG. 10 is a view showing a rotating member and a magnet assembly of the power generator shown in FIG. 7. FIG. 11 is a top view showing an internal configuration of the power generator shown in FIG. 7. In this regard, an upper plate of the power generator is omitted in FIG. 11 for showing the internal configuration of the power generator.

Hereinafter, an upper side in each of FIGS. 2 to 10 is referred to as "upper" or "upper side", a lower side in each of FIGS. 2 to 10 is referred to as "lower" or "lower side", a left side in each of FIGS. 2 to 10 is referred to as "left" or "left side" and a right side in each of FIGS. 2 to 10 is referred to as "right" or "right side". Further, a rear side of the paper in each of FIGS. 2 to 10 is referred to as "rear side" and a front side of the paper in each of FIGS. 2 to 10 is referred to as "front side".

A locking device 1 of the present invention shown in FIGS. 2 and 3 is used for locking a tongue 200 in the locking device 1. The tongue 200 includes a plate-like portion 201, an engagement hole 202 for engaging with a locking member 3 (see FIGS. 3 and 5) in the locking device 1 and a belt insertion hole 203 through which a belt (not shown in the drawings) is inserted. The engagement hole 202 is a substantially rectangular aperture formed in a tip end portion of the plate-like portion 201. The belt insertion hole 203 is a substantially rectangular aperture formed in a base end portion of the plate-like portion 201.

A width of the tip end portion of the plate-like portion 201 is narrower than a width of a tongue insertion port 23 of a main body 2 of the locking device 1. Thus, the tip end portion of the plate-like portion 201 can be inserted into the main body 2 of the locking device 1 through the tongue insertion port 23. On the other hand, a width of the base end portion of the plate-like portion 201 is wider than the width of the tongue insertion port 23 of the main body 2 of the locking device 1. Thus, insertion of the tongue 200 into the main body 2 of the locking device 1 is restricted when the base end portion of the tongue 200 is engaged with an edge of the tongue insertion port 23 of the main body 2 of the locking device 1. As shown in FIG. 2, when the tip end portion of the tongue 200 is inserted into the main body 2 of the locking device 1, the tongue 200 is locked (fixed) by the locking device 1. In this regard, a constituent material for the tongue 200 is not particularly limited to a specific kind. It is possible to form the tongue 200 with a metallic material or a resin material.

In this regard, the word of "tongue" in the specification broadly means a plate-like member in which the engagement hole 202 is formed in the tip end portion of the plate-like portion 201 for the locking as shown in FIG. 2 and which is used for fixing an arbitrary object. Typically, such a tongue 200 can be used in a seat-belt device of a vehicle or an airplane in a state that the belt is inserted through the belt insertion hole 203 in the base end portion of the tongue 200. In addition, the tongue 200 can be used for fixing a cargo such as a container, a loaded object or the like in the state that the belt is inserted through the belt insertion hole 203 in the base end portion of the tongue 200.

Further, the tongue 200 can be used for restricting motion of an arbitrary object in a state that the belt is not inserted through the belt insertion hole 203 in the base end portion of the tongue 200. For example, the tongue 200 may be provided at a cover of an opening and closing box which can be pivotally moved and a locking device such as the locking device 1 of the present invention may be provided at a main body portion (a containing portion) of the opening and closing box. In such a usage state, the tongue 200 is inserted into the locking device provided at the main body portion of the opening and closing box to lock the tongue 200. By locking the tongue 200 in this manner, it is possible to restrict pivotal movement of the cover of the opening and closing box (motion for opening the opening and closing box) and lock the opening and closing box. Further, the tongue 200 may be provided at a door pivotally moved and provided at a fixed arbitrary object such as a shelf and the locking device may be provided at the arbitrary fixed object such as a shelf. In such a usage state, the tongue 200 is inserted into the locking device provided at the fixed object to lock the tongue 200. By locking the tongue 200 in this manner, it is possible to restrict pivotal movement of the door and lock the door.

As shown in FIG. 3, the locking device 1 includes the main body 2 having the tongue insertion port 23 through which the tongue 200 is inserted, the locking member 3 for locking the tongue 200 when the tongue 200 inserted into the main body 2 through the tongue insertion port 23 reaches a predetermined position in the main body 2, a tongue guiding and discharging mechanism 4 having a tongue guiding and discharging member 41 for guiding the tongue 200 until the tongue 200 is locked by the locking member 3 when the tongue 200 is inserted into the main body 2 and discharging the tongue 200 when the lock of the tongue 200 due to the locking member 3 is released, a power generator 5 which can generate electric power at the time of inserting and discharging the tongue 200, a holding part 6 for fixedly holding the power generator 5 in the locking device 1 and a wireless transmitting part 7 driven by the electric power generated by the power generator 5.

The main body 2 includes an outer frame 21 and a lock releasing operation member 22 serving as an operation member operated for releasing the lock of the tongue 200 due to the locking member 3 and also serving as a cover for the main body 2. Each component of the locking device 1 is contained in a space defined between the outer frame 21 and the lock releasing operation member 22.

As shown in FIG. 3, the outer frame 21 includes a bottom plate 211 and a pair of side walls 212 respectively extending from side portions of the bottom plate 211 toward the upper side. The outer frame 21 has a U-like shape opening toward the upper side. Further, the bottom plate 211 and the pair of side walls 212 are formed integrally with each other. Through-holes 213 through which a pivotal movement shaft 31 of the locking member 3 described later is inserted are respectively formed in the pair of side walls 212 of the outer frame 21 on the rear side (the side from which the tongue 200 is inserted).

As shown in FIGS. 3 and 4, the lock releasing operation member 22 includes an upper plate 221 and a pair of side walls 222 respectively extending toward the lower side from side portions of the upper plate 221 on the rear side (the side from which the tongue 200 is inserted). Further, the upper plate 221 and the pair of side walls 222 are formed integrally with each other. Through-holes 233 are respectively formed in the pair of side walls 222 at positions corresponding to the through-holes 213 of the pair of side walls 212 of the outer frame 21. Further, positioning protrusions 224 to be engaged with the bottom plate 211 of the outer frame 21 to position the lock releasing operation member 22 in a state that the main body 2 has been assembled are respectively formed at lower end portions of the pair of side walls 222 on the front side.

Further, as shown in FIG. 4, a half-round engagement portion 225 formed so as to cover the pivotal movement shaft 31 of the locking member 3 inserted through the through-holes 223 is provided at an end portion of the upper plate 221 on the rear side (the side from which the tongue 200 is inserted). In the state that the main body 2 has been assembled, the pivotal movement shaft 31 of the locking member 3 inserted through the through-holes 213 of the outer frame 21 and the through-holes 223 of the lock releasing operation member 22 is located in a space defined between the upper plate 221 and the half-round engagement portion 225 of the lock releasing operation member 22.

By inserting the pivotal movement shaft 31 of the locking member 3 into the through-holes 213 of the outer frame 21 and the through-holes 223 of the lock releasing operation member 22 and respectively attaching fastening tools 32 to both ends of the pivotal movement shaft 31 of the locking member 3 in a state that the upper plate 221 of the lock releasing operation member 22 faces the bottom plate 211 of the outer frame 21 and the positioning protrusions 224 of the lock releasing operation member 22 make contact with the bottom plate 211 of the outer frame 21, the main body 2 is assembled. In the state that the main body 2 has been assembled, the lock releasing operation member 22 also serves as an upper cover for the main body 2.

In the state that the main body 2 has been assembled, the tongue insertion port 23 is defined at an end portion of the main body 2 on the rear side (the side from which the tongue 200 is inserted) by the outer frame 21 and the lock releasing operation member 22. The tongue 200 is inserted into the main body 2 and discharged from the main body 2 through the tongue insertion port 23.

In the state that the main body 2 has been assembled, the lock releasing operation member 22 can be pivotally moved around the pivotal movement shaft 31 of the locking member 3. In a state that the tongue 200 is not inserted into the locking device 1 and a state that the tongue 200 is locked by the locking member 3 of the locking device 1, the upper plate 221 of the lock releasing operation member 22 faces the bottom plate 211 of the outer frame 21. In order to release the lock of the tongue 200 due to the locking member 3, the lock releasing operation member 22 is pivotally moved around the pivotal movement shaft 31 of the locking member 3 toward the upper side so as to be separated from the outer frame 21. When the lock releasing operation member 22 is pivotally moved around the pivotal movement shaft 31 toward the upper side, the engagement portion 225 of the lock releasing operation member 22 pushes up the locking member 3, and thereby the lock of the tongue 200 due to the locking member 3 is released.

As shown in FIG. 5, the locking member 3 includes the pivotal movement shaft 31, the fastening tools 32 respectively attached to both ends of the pivotal movement shaft 31 and a pivotally moving portion 33 provided so as to be pivotally moved around the pivotal movement shaft 31. The pivotally moving portion 33 includes a pair of arm portions 331 facing each other and having through-holes through which the pivotal movement shaft 31 is inserted, a plate-like portion 332 for connecting end portions of the pair of arm portions 331 and an engagement portion 333 formed so as to protrude from the plate-like portion 332 toward the lower side. The pair of arm portions 331, the plate-like portion 332 and the engagement portion 333 are formed integrally with each other.

The engagement portion 333 is downwardly inclined at a substantially central portion of the plate-like portion 332 from the rear side (the side from which the tongue 200 is inserted) toward the front side. When the tongue 200 is inserted into the main body 2, the tip end portion of the tongue 200 makes contact with an inclined lower surface of the engagement portion 333 and thus the pivotally moving portion 33 is pushed up and pivotally moved around the pivotal movement shaft 31. After that, when the tongue 200 reaches the predetermined position in the main body 2, the engagement portion 333 of the pivotally moving portion 33 is inserted into the engagement hole 202 of the tongue 200, and thereby the tongue 200 is locked.

Further, when the lock releasing operation member 22 is pivotally moved around the pivotal movement shaft 31 toward the upper side in order to release the lock of the tongue 200 due to the locking member 3, the pivotally moving portion 33 is pushed up by the engagement portion 225 of the lock releasing operation member 22. As a result, the engagement portion 333 of the pivotally moving portion 33 is left from the engagement hole 202 of the tongue 200 and the lock of the tongue 200 due to the locking member 3 is released.

As shown in FIG. 6, the tongue guiding and discharging mechanism 4 includes the tongue guiding and discharging member 41 provided so as to be slidably moved along the insertion direction of the tongue 200, a support portion 42 fixedly provided on the outer frame 21 of the main body 2, a pair of guide shafts 43 fixedly attached to the support portion 42 and slidably holding the tongue guiding and discharging member 41 and coil springs 44 respectively attached to the pair of guide shafts 43.

The tongue guiding and discharging member 41 includes a plate-like engagement portion 411 engaged with the tongue 200 at the time of inserting and discharging the tongue 200 and a contact portion 412 formed so as to protrude from an upper surface of the engagement portion 411.

A tongue receiving concave portion 413 having a shape corresponding to the tip end portion of the tongue 200 is formed on the engagement portion 411 on the rear side (the side from which the tongue 200 is inserted). The tongue 200 inserted into the main body 2 through the tongue insertion port 23 is engaged with the tongue receiving concave portion 413 of the engagement portion 411 and guided by the tongue guiding and discharging member 41.

Through-holes through which the guide shafts 43 are inserted are respectively formed on both end portions in a width direction of the engagement portion 411. By respectively inserting the guide shafts 43 into these through-holes, the tongue guiding and discharging member 41 is held so as to be slidably moved along the insertion direction of the tongue 200.

Further, the coil springs 44 are respectively attached to the pair of guide shafts 43. The guide shafts 43 are respectively located in central hollow portions of the coil springs 44. When the tongue 200 is inserted into the main body 2 through the tongue insertion port 23, the tongue receiving concave portion 413 of the engagement portion 411 of the tongue guiding and discharging member 41 is engaged with the tip end portion of the tongue 200. The tongue guiding and discharging member 41 is pushed by the tongue 200 due to the insertion of the tongue 200 into the main body 2 and thus the tongue guiding and discharging member 41 is slid in the insertion direction of the tongue 200. At this time, the coil springs 44 respectively attached to the pair of guide shafts 43 are elastically deformed (compressed).

When the tongue 200 is inserted into the main body 2, the tongue guiding and discharging member 41 is slid in the main body 2 in the insertion direction of the tongue 200 to guide the tongue 200 until the tongue 200 reaches the predetermined position in the main body and the tongue 200 is locked by the locking member 3. While the tongue 200 is being locked by the locking member 3, the coil springs 44 keep a state that the coil springs 44 are elastically deformed.

After that, when the lock of the tongue 200 due to the locking member 3 is released due to the pivotal operation with respect to the lock releasing operation member 22, the coil springs 44 are elastically restored. At this time, the tongue guiding and discharging member 41 is slid in a discharging direction of the tongue 200 by the coil springs 44 to discharge the tongue 200 from the main body 2.

The contact portion 412 protrudes from the upper surface of the engagement portion 411 and always makes contact with an operation member 53 of the power generator 5 (see FIGS. 3, 7 and 9) in a state that the locking device 1 has been assembled. When the tongue 200 is inserted into the main body 2 and the tongue guiding and discharging member 41 is slid in the insertion direction of the tongue 200, the contact portion 412 pushes the operation member 53 of the power generator 5. When the operation member 53 is pushed by the contact portion 412, the operation member 53 is pivotally moved from a predetermined initial position in a first direction in a plane parallel to the insertion direction of the tongue 200, and thereby external force is applied to the power generator 5 through the operation member 53.

When the tongue 200 is inserted into the main body 2 and the tongue 200 is locked by the locking member 3, pivotal movement of the operation member 53 of the power generator 5 in the first direction due to the contact portion 412 finishes and the power generator 5 performs first power generation.

When the lock of the tongue 200 due to the locking member 3 is released, the tongue guiding and discharging member 41 is slid in the discharging direction of the tongue 200 as described above and the tongue 200 is discharged from the main body 2. At this time, the operation member 53 of the power generator 5 is pivotally moved in a second direction opposite to the first direction in the plane parallel to the insertion direction of the tongue 200 so as to return to the predetermined initial position and the power generator 5 performs second power generation.

The electric power generated in the first power generation and the second power generation of the power generator 5 is supplied to the wireless transmitting part 7. The wireless transmitting part 7 is driven by the electric power supplied from the power generator 5 and a signal is transmitted to an external device such as a management device.

Referring back to FIG. 3, the power generator 5 is held by the holding part 6 fixedly provided on the outer frame 21 and thus fixedly provided in the main body 2. Further, power lead wires (not shown in the drawings) of the power generator 5 are connected to the wireless transmitting part 7. The wireless transmitting part 7 is fixedly provided in the main body 2 and has a function of wirelessly transmitting the signal to the external device such as a management device by utilizing the electric power generated by the power generator 5. The external device can receive and analyze the signal wirelessly transmitted from the wireless transmitting part 7 to determine whether or not the tongue 200 is now locked by the locking device 1.

Next, the power generator 5 used in the present invention will be described in detail with reference to FIG. 7. In this regard, it is noted that the upper side and the lower side of the power generator 5 are inverted between FIGS. 3 and 7. Namely, the power generator 5 is arranged in the locking device 1 shown in FIG. 3 with being turned upside down from the perspective view shown in FIG. 7.

In general, the power generator 5 shown in FIG. 7 includes a case 51 (see FIG. 3) for containing each component of the power generator 5, a coil assembly 52 containing a coil 522 fixedly provided in the case 51, the operation member 53 provided so as to be pivotally moved with respect to the case 51 around a first axis member 54a in the plane parallel to the insertion direction of the tongue 200 when the operation member 53 is operated by the contact portion 412 of the tongue guiding and discharging member 41 for applying the external force, a rotating member 55 provided so as to be rotated by the operation member 53, a magnet assembly 56 containing a first magnet 561a and a second magnet 561b attached to the rotating member 55 so that the first magnet 561a and the second magnet 561b can be rotated and moved with respect to the coil 522, an upper torsion spring 57a and a lower torsion spring 57b for storing the external force applied from the contact portion 412 of the tongue guiding and discharging member 41 through the operation member 53 as elastic energy and releasing the stored elastic energy to relatively rotate and move the magnets 561a, 561b with respect to the coil 522.

As shown in FIG. 3, in the state that the power generator 5 has been assembled, an arm portion 531 of the operation member 53 protrudes from the case 51 toward the outside. When the tongue 200 is inserted into the main body 2 through the tongue insertion port 23, the contact portion 412 of the tongue guiding and discharging member 41 contacting with the operation member 53 pushes the operation member 53 and applies the external force so as to pivotally move the operation member 53 in the plane parallel to the insertion direction of the tongue 200. When the external force is applied to the power generator 5 through the tongue guiding and discharging member 41, the power generator 5 performs the first power generation and the second power generation by utilizing the external force applied through the tongue guiding and discharging member 41.

Power Generator 5

Hereinafter, each component of the power generator 5 will be described in detail.

Case 51

The case 51 is an elongated box-like member (with a size of about 8 mm width×about 12 mm height×about 33 mm length, for example) for containing each component of the power generator 5. As shown in FIG. 7, the case 51 includes a lower plate 511, an upper plate 512, a movable portion containing portion 513 for containing movable portions of the power generator 5 and an external core portion 514 which contains the coil assembly 52 and serves as an external core for the coil 522.

The lower plate 511 is an elongated plate-like member serving as a base plate for the entire of the power generator 5. The movable portion containing portion 513 is integrally formed on a left-side portion of an upper surface of the lower plate 511. The movable portion containing portion 513 is constituted of four plate-like portions surrounding a space for containing the movable portions of the power generator 5. Further, slits 5131, 5132, 5133 through which a magnetic core 523 of the coil assembly 52, a first plate-like portion 5141 and a second plate-like portion 5142 of the external core portion 514 are respectively inserted are formed in a right-side surface of the movable portion containing portion 513. Furthermore, a right-side end portion of the lower plate 511 is configured to be engaged with the external core portion 514.

Further, a cutout portion 5134 is formed in a left-side portion of the movable portion containing portion 513. As shown in FIG. 3, in the state that the power generator 5 has been assembled, the arm portion 531 of the operation member 53 protrudes toward the outside of the case 51 through the cutout portion 5134.

The first axis member 54a and a second axis member 54b are fixedly provided on the upper surface of the lower plate 511 and in the movable portion containing portion 513. The first axis member 54a includes a first support portion 541a for supporting a lower surface of the operation member 53 and a first axis 542a formed on the first support portion 541a.

The first support portion 541a is a columnar member and inserted into a central hollow portion of a torsion spring 58 for biasing the operation member 53 in the state shown in FIG. 11 in that the power generator 5 has been assembled.

The first axis 542a is a columnar member formed on a substantially central portion of an upper surface of the first support portion 541a and inserted into an axis insertion hole 532 of the operation member 53 in the state shown in FIG. 11 in that the power generator 5 has been assembled. In this regard, a diameter of the first support portion 541a is larger than a diameter of the axis insertion hole 532 and thus the operation member 53 is supported on the first support portion 541a in the state shown in FIG. 11 in that the power generator 5 has been assembled.

The second axis member 54b includes a second support portion 541b for supporting a lower surface of the rotating member 55 and a second axis 542b formed on the second support portion 541b. The second support portion 541b is a columnar member and inserted into a central hollow portion of the lower torsion spring 57b in the state shown in FIG. 11 in that the power generator 5 has been assembled.

The second axis 542b is a columnar member formed on a substantially central portion of an upper surface of the second support portion 541b and inserted into an axis insertion hole 553 of the rotating member 55 in the state shown in FIG. 11 in that the power generator 5 has been assembled. In this regard, a diameter of the second support portion 541b is larger than a diameter of the axis insertion hole 553 and thus the rotating member 55 is supported on the second support portion 541b in the state shown in FIG. 11 in that the power generator 5 has been assembled.

The upper plate 512 is an elongated plate-like member serving as a cover for the entire of the power generator 5. The upper plate 512 includes a first insertion hole 5121 for supporting an end portion of the first axis 542a and a second insertion hole 5122 for supporting an end portion of the second axis 542b.

The first insertion hole 5121 is formed at a position corresponding to the first axis 542a on the lower plate 511. The second insertion hole 5122 is formed at a position corresponding to the second axis 542b on the lower plate 511. A right-side end portion of the upper plate 512 is configured to be engaged with the external core portion 514.

Further, a left-side end portion of the upper plate 512 is configured to form an opening portion through which the arm portion 531 of the operation member 53 protrudes from the case 51 in corporation with the cutout portion 5134 of the movable portion containing portion 513 on the lower plate 511. By engaging the lower plate 511, the upper plate 512, the movable portion containing portion 513 and the external core portion 514 with each other in a state that each component of the power generator 5 are contained in the case 51, it is possible to assemble the power generator 5.

As a constituent material for the lower plate 511, the upper plate 512 and the movable portion containing portion 513 of the case 51 described above, it is possible to use a non-magnetic material and a weakly magnetic material. The lower plate 511, the upper plate 512 and the movable portion containing portion 513 may be formed with the same non-magnetic material or weakly magnetic material or may be formed with different kinds of the non-magnetic material or weakly magnetic material.

The external core portion 514 includes the first plate-like portion 5141, the second plate-like portion 5142 facing the first plate-like portion 5141 and a connecting portion 5143 for connecting the first plate-like portion 5141 and the second plate-like portion 5142. In the state shown in FIG. 11 in that the power generator 5 has been assembled, the coil assembly 52 (the coil 522) is contained between the first plate-like portion 5141 and the second plate-like portion 5142.

Each component (the first plate-like portion 5141, the second plate-like portion 5142 and the connecting portion 5143) of the external core portion 514 is formed with a magnetic material and serves as the external core of the coil assembly 52 (the coil 522). Examples of the magnetic material for forming the external core portion 514 include a ferritic stainless steel (for example, JIS SUS 430), a cold rolled steel (for example, SPCC), a martensitic stainless steel (for example, JIS SUS 420), a pure iron (for example, JIS SUY), a soft iron, a carbon steel, a magnetic steel (a silicon steel), a high-speed tool steel, a structural steel (for example, JIS SS 400), a permalloy and a combination of two of more of these materials. Among them, it is especially preferable to form the external core portion 514 with the ferritic stainless steel having superior strength and corrosion resistance or the cold rolled steel having superior formability and workability. Each component of the external core portion 514 may be formed with the same magnetic material or may be formed with different kinds of the magnetic material.

Since each component of the external core portion 514 is formed with the magnetic material, the external core portion 514 can serve as a part of a magnetic circuit in which magnetic flux (lines of magnetic force) generated from the magnets 561a, 561b and passing through the coil 522 flows.

The first plate-like portion 5141 is an elongated plate-like member. A first bent portion 5144 is formed at a left-side end of the first plate-like portion 5141. The first bent portion 5144 is formed by bending the left-side end of the first plate-like portion 5141 toward the inner side (the rear side in FIG. 7). Further, the first bent portion 5144 is configured so that a left-side end portion of the first bent portion 5144 faces an end portion of the first magnet 561a during motion of the power generator 5 described with reference to FIGS. 12A to 12D and 13A to 13D.

The second plate-like portion 5142 is an elongated plate-like member which is the substantially same as the first plate-like portion 5141. A second bent portion 5145 is formed at a left-side end of the second plate-like portion 5142. The second bent portion 5145 is formed by bending the left-side end of the second plate-like portion 5142 toward the inner side (the front side in FIG. 7). Further, the second bent portion 5145 is configured so that a left-side end portion of the second bent portion 5145 faces an end portion of the second magnet 561*b* during the motion of the power generator 5 described with reference to FIGS. 12A to 12D and 13A to 13D.

Further, in the state shown in FIG. 11 in that the power generator 5 has been assembled, the first bent portion 5144 of the first plate-like portion 5141 is inserted through the slit 5132 of the movable portion containing portion 513 of the case 51 and thus the left-side end portion of the first bent portion 5144 is located in the movable portion containing portion 513. As is the case with the first bent portion 5144, the second bent portion 5145 of the second plate-like portion 5142 is inserted through the slit 5133 of the movable portion containing portion 513 of the case 51 and thus the left-side end portion of the second bent portion 5145 is located in the movable portion containing portion 513.

In this regard, although the first plate-like portion 5141, the second plate-like portion 5142 and the connecting portion 5143 are formed integrally with each other in this embodiment, the present invention is not limited thereto. For example, all of the first plate-like portion 5141, the second plate-like portion 5142 and the connecting portion 5143 may be formed as different components or the connecting portion 5143 may be formed integrally with one of the first plate-like portion 5141 and the second plate-like portion 5142.

Coil Assembly 52

As shown in FIG. 8, the coil assembly 52 includes a bobbin 521, the coil 522 formed by winding a wire on an outer periphery of the bobbin 521 and the magnetic core 523 inserted into a central hollow portion of the bobbin 521 (a central hollow portion of the coil 522).

When the magnets 561*a*, 561*b* are relatively moved with respect to the coil 522, the density of the magnetic flux in the coil 522 varies, and thereby an electromotive voltage is generated in the coil 522. Both end portions of the coil 522 (the above-described power lead wires of the power generator 5) are connected to the wireless transmitting part 7 and the electric power generated in the coil 522 is supplied to the wireless transmitting part 7 through the power lead wires, and thereby the wireless transmitting part 7 is driven by the supplied electronic power.

The coil assembly 52 is fixedly arranged on the lower plate 511 of the case 51. Further, in the state shown in FIG. 11 in that the power generator 5 has been assembled, the coil assembly 52 is located between the first plate-like portion 5141 and the second plate-like portion 5142 of the external core portion 514 of the case 51. A method for fixedly arranging the coil assembly 52 on the lower plate 511 of the case 51 is not particularly limited to a specific method. It is possible to fixedly arrange the coil assembly 52 on the lower plate 511 with a bonding method due to an adhesive agent, a thermal fusion method, a fixing method due to a fixing tool such as a screw and a combination of two or more of these methods.

The coil 522 is formed by winding the wire around the bobbin 521 so that a cross-sectional shape of the coil 522 becomes a flattened elliptical shape. The magnetic core 523 is a plate-like member having a size and a shape which can be inserted into the central hollow portion of the bobbin 521 (the central hollow portion of the coil 522) and formed with the same or similar magnetic material as the external core portion 514 of the case 51.

The wire for forming the coil 522 is not limited to a specific kind. Examples of the wire include a wire obtained by covering a copper base line with an insulating layer, a wire obtained by covering a copper base line with an insulating layer to which an adhesive (fusion) function is imparted and a combination of two or more of these wires. In this regard, a cross-sectional shape of the wire may be any shape. Examples of the cross-sectional shape of the wire include a polygonal shape such as a triangular shape, a square shape, a rectangular shape and a hexagonal shape; a circular shape and an elliptical shape.

Operation Member 53

As shown in FIG. 9, the operation member 53 is a member which is operated by the contact portion 412 of the tongue guiding and discharging member 41 so as to be pivotally moved around the first axis 542*a* in the plane parallel to the insertion direction of the tongue 200 for applying the external force to the power generator 5. As shown in FIG. 9, the operation member 53 includes the elongated arm portion 531, the axis insertion hole 532 through which the first axis 542*a* is inserted, a through-hole 533 for receiving an end portion 582 of the torsion spring 58 and an engagement portion 534 to be engaged with the rotating member 55.

The axis insertion hole 532 is formed in the arm portion 531 so as to pass through the arm portion 531 in a thickness direction thereof and configured so that the first axis 542*a* of the first axis member 54*a* can be inserted into the axis insertion hole 532. The through-hole 533 is formed in a portion of the arm portion 531 outwardly protruding from a portion in which the axis insertion hole 532 is formed so as to pass through the arm portion 531 in the thickness direction thereof. Further, the through-hole 533 is configured to receive the end portion 582 of the torsion spring 58. The engagement portion 534 is a rectangular columnar member formed so as to protrude from an end portion of the arm portion 531 toward the outside and configured to be engaged with an engagement portion 556 of the rotating member 55 described later during the motion of the power generator 5 described with reference to FIGS. 12A to 12D and 13A to 13D.

In the state shown in FIG. 11 in that the power generator 5 has been assembled, the first axis 542*a* of the first axis member 54*a* is inserted into the axis insertion hole 532 of the operation member 53, the end portion 582 of the torsion spring 58 is inserted into the through-hole 533 and the lower surface of the operation member 53 is supported by the first support portion 541*a* of the first axis member 54*a*. With this configuration, it is possible to support the operation member 53 so that the operation member 53 can be pivotally moved with respect to the case 51 around the first axis 542*a*.

Rotating Member 55

The rotating member 55 is provided in the case 51 so as to be rotated by the operation member 53 and supports the magnet assembly 56 (the magnets 561*a*, 561*b*).

As shown in FIG. 10, the rotating member 55 includes a main body 551, a columnar spring fitting axis 552 provided on an upper surface of the main body 551, an axis insertion hole 553 formed in a substantially central portion of an upper surface of the spring fitting axis 552, a magnet assembly attachment portion 554 formed on a right-side surface of the main body 551, a pair of spring end portion support portions 555*a*, 555*b* (see FIG. 11) formed on a surface opposite to the surface of the main body 551 on which the magnet assembly attachment portion 554 is formed and the engagement portion 556 formed so as to protrude from a left-end surface of the main body 551 toward the outside.

The spring fitting axis 552 is provided on the upper surface of the main body 551 and inserted into a central hollow portion of the upper torsion spring 57a in the state shown in FIG. 11 in that the power generator 5 has been assembled. A height of the spring fitting axis 552 is substantially equal to a height of the central hollow portion of the upper torsion spring 57a.

The axis insertion hole 553 is formed in the substantially central portion of the upper surface of the spring fitting axis 552 so as to pass through the main body 551 and the spring fitting axis 552 in the thickness direction thereof. In the state shown in FIG. 11 in that the power generator 5 has been assembled, the second axis 542b is inserted into the axis insertion hole 553.

The magnet assembly attachment portion 554 is a concave portion having a V-shape and formed on the right-side surface of the main body 551. In the state shown in FIG. 11 in that the power generator 5 has been assembled, the magnet assembly 56 is attached to the magnet assembly attachment portion 554.

As shown in FIG. 11, the pair of spring end portion support portion 555a, 555b are concave portions formed so as to be vertically symmetry through the spring fitting axis 552 in a top view of the rotating member 55. In the state shown in FIG. 11 in that the power generator 5 has been assembled, an end portion 571b of the lower torsion spring 57b is inserted into the spring end portion support portion 555a and an end portion 572a of the upper torsion spring 57a is inserted into the spring end portion support portion 555b. With this configuration, the rotating member 55 is supported by the upper torsion spring 57a and the lower torsion spring 57b.

The engagement portion 556 is formed so as to protrude from the left-side surface of the main body 551 toward the outside and configured to be engaged with the engagement portion 534 of the operation member 53 during the motion of the power generator 5 described with reference to FIGS. 12A to 12D and 13A to 13D.

In the state shown in FIG. 11 in that the power generator 5 has been assembled, the end portion 572a of the upper torsion spring 57a is inserted into the spring end portion support portion 555b, the end portion 571b of the lower torsion spring 57b is inserted into the spring end portion support portion 555a and the second axis 542b is inserted into the axis insertion hole 553 of the rotating member 55. With this configuration, it is possible to rotatably support the rotating member 55.

The rotating member 55 is formed with a non-magnetic material or a weakly magnetic material. Among non-magnetic materials and weak magnetic materials, it is preferable to form the rotating member 55 with a POM (polyacetal) whose weight is light. By forming the rotating member 55 with the POM whose weight is light, it is possible to improve slidability of the rotating member 55. Further, each component of the rotating member 55 described above may be formed integrally with each other or may be formed as different components.

Magnet Assembly 56

As shown in FIG. 10, the magnet assembly 56 includes a yoke 562 attached to the magnet assembly attachment portion 554, and the first magnet 561a and the second magnet 561b attached to the yoke 262.

The yoke 562 has a V-shape corresponding to the V-shape of the magnet assembly attachment portion 554 and is configured so that a V-shaped inner surface of the yoke 562 fits with the V-shaped outer surface of the magnet assembly attachment portion 554. The yoke 562 is formed with the same or similar magnetic material as the external core portion 514 of the case 51 and thus can serve as a part of the magnetic circuit in which the magnetic flux (the lines of magnetic force) passing through the coil 522 flows.

The first magnet 561a and the second magnet 561b are respectively attached to outer surfaces of two inclined planes of the yoke 562 forming the V-shape due to their own magnetic force. In this regard, the first magnet 561a and the second magnet 561b may be attached to the yoke 562 due to an adhesive agent or the like in addition to their own magnetic force. With this configuration, it is possible to reliably prevent the first magnet 561a and the second magnet 561b from being shifted on the yoke 562 and left from the yoke 562.

Each of the first magnet 561a and the second magnet 561b is the same kind of magnet having the same rectangular columnar shape and the same magnetic force. The first magnet 561a is attached to one of the two inclined planes of the yoke 562 forming the V-shape so that a north pole plane of the first magnet 561a faces the yoke 562. On the other hand, the second magnet 561b is attached to the other one of the two inclined planes of the yoke 562 forming the V-shape so that a south pole plane of the second magnet 561b faces the yoke 562.

As the magnets 561a, 561b, it is possible to use an alnico magnet, a ferrite magnet, a neodymium magnet, a samarium-cobalt magnet, a magnet (a bonded magnet) obtained by molding a composite material prepared by pulverizing and mixing at least one of these magnets with a resin material or a rubber material, or the like. Among them, it is preferable to use the neodymium magnet having strong magnetic force or the samarium-cobalt magnet having high heat resistance as the magnets 561a, 561b.

In the state shown in FIG. 11 in that the power generator 5 has been assembled, the magnet assembly 56 is attached to the magnet assembly attachment portion 554 of the rotating member 55. Thus, when the rotating member 55 is rotated by the operation member 53, the magnet assembly 56 is rotated and moved with respect to the coil 522 around the second axis 542b.

When the rotating member 55 is rotated by the operation member 53 to relatively rotate and move the magnet assembly 56 with respect to the coil 522 around the second axis 542b, the magnets 561a, 561b are relatively rotated and moved with respect to the coil 522 around the second axis 542b. When the magnets 561a, 561b are relatively moved with respect to the coil 522, the number of the lines of magnetic force (the density of the magnetic flux) passing through the coil 522 varies, thereby generating the electromotive voltage in the coil 522.

Thus, in the power generator 5 of the present invention, the coil 522 (the coil assembly 52) and the magnets 561a, 561b (the magnet assembly 56) which are relatively rotated and moved with respect to the coil 522 form a power generating unit for generating the electric power.

Upper Torsion Spring 57a and Lower Torsion Spring 57b

Each of the upper torsion spring 57a and the lower torsion spring 57b has the same configuration with each other and is arranged so as to be vertically symmetric through the rotating member 55 in the state shown in FIG. 11 in that the power generator 5 has been assembled.

In the state shown in FIG. 11 in that the power generator 5 has been assembled, the lower torsion spring 57b is placed on the lower plate 511 of the case 51 and positioned below the rotating member 55. Further, the second support portion 541b of the second axis member 54b is inserted into the central hollow portion of the lower torsion spring 57b. Furthermore, the one end portion 571b of the lower torsion spring 57b is inserted into the spring end portion support portion 555a of the rotating member 55 to support the one end portion 571b of the lower torsion spring 57b and the other end portion 572b of the lower torsion spring 57b is engaged with an inner surface of the movable portion containing portion 513 of the case 51 to support the other end portion 572b of the lower torsion spring 57b.

On the other hand, in the state shown in FIG. 11 in that the power generator 5 has been assembled, the upper torsion spring 57a is placed on the upper surface of the main body 551 of the rotating member 55 and positioned above the rotating member 55. Further, the spring fitting axis 552 of the rotating member 55 is inserted into the central hollow portion of the upper torsion spring 57a. Furthermore, the one end portion 571a of the upper torsion spring 57a is engaged with the inner surface of the movable portion containing portion 513 of the case 51 to support the one end portion 571a of the upper torsion spring 57a and the other end portion 572a of the upper torsion spring 57a is inserted into the spring end portion support portion 555b of the rotating member 55 to support the other end portion 572a of the upper torsion spring 57a.

With this configuration, when the operation member 53 is pivotally moved by the external force applied through the tongue guiding and discharging member 41 and the rotating member 55 is rotated around the second axis 542b by the operation member 53, the applied external force is stored in the upper torsion spring 57a and the lower torsion spring 57b as the elastic energy. Further, the upper torsion spring 57a and the lower torsion spring 57b can release the stored elastic energy to rapidly rotate the rotating member 55 around the second axis 542b.

Since the magnet assembly 56 is attached to the magnet assembly attachment portion 554 of the rotating member 55 as described above, the magnets 561a, 561b of the magnet assembly 56 are also rapidly rotated and moved with respect to the coil 522 around the second axis 542b when the rotating member 55 is rapidly rotated around the second axis 542b.

Thus, in the power generator 5, each of the upper torsion spring 57a and the lower torsion spring 57b serves as an elastic member for storing the external force applied through the tongue guiding and discharging member 41 as the elastic energy and releasing the stored elastic energy to relatively rotate and move the magnets 561a, 561b with respect to the coil 522.

Torsion Spring 58

The torsion spring 58 is a member for holding the operation member 53 at a predetermined initial position. In the state shown in FIG. 11 in that the power generator 5 has been assembled, the torsion spring 58 is placed on the lower plate 511 of the case 51 and positioned below the operation member 53. Further, the first support portion 541a of the first axis member 54a is inserted into the central hollow portion of the torsion spring 58. Further, the one end portion 581 of the torsion spring 58 is engaged with the inner surface of the movable portion containing portion 513 of the case 51 to support the one end portion 581 of the torsion spring 58 and the other end portion 582 of the torsion spring 58 is inserted into the through-hole 533 of the operation member 53 to support the other end portion 582 of the torsion spring 58. With this configuration, it is possible to hold the operation member 53 at the predetermined initial position.

Motion of the Power Generator 5

Next, description will be given to the motion of the power generator 5 with reference to FIGS. 12A to 14D and 13A to 13D. FIGS. 12A to 12D are views for explaining motion of the first power generation of the power generator shown in FIG. 7. FIGS. 13A to 13D are views for explaining motion of the second power generation of the power generator shown in FIG. 7. In this regard, the upper plate 512 of the power generator 5 is omitted for showing the internal configuration of the power generator 5 in FIGS. 12A to 12D and 13A to 13D.

Initial State

Figure 12A:
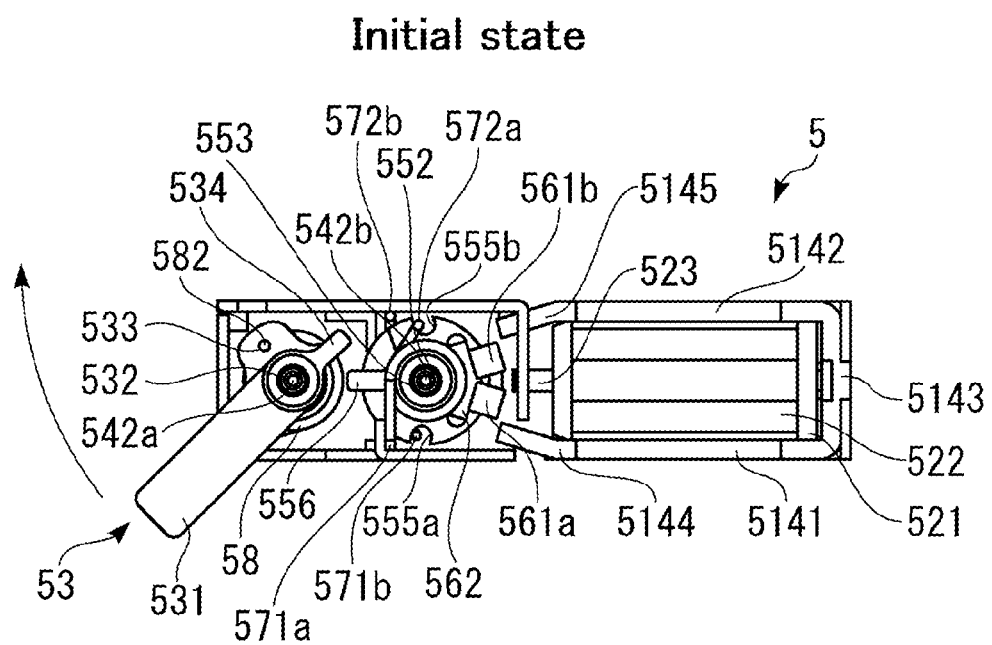
FIG. 12A is a top view of the power generator in an initial state that the external force is not applied to the operation member.

FIG. 12A shows a top view of the power generator 5 in an initial state that the power generator 5 has been assembled and the external force is not applied to the operation member 53 through the tongue guiding and discharging member 41. As shown in FIG. 12A, in the initial state that the external force is not applied to the operation member 53, the engagement portion 534 of the operation member 53 is separated from the engagement portion 556 of the rotating member 55 by a predetermined distance. Further, the first magnet 561a and the second magnet 561b are positioned so as to be separated from the external core portion 514 of the case 51 and the magnetic core 523 of the coil assembly 52 by a predetermined distance.

In the initial state, the first magnet 561a is positioned between the first bent portion 5144 of the first plate-like portion 5141 of the external core portion 514 and the magnetic core 523 of the coil assembly 52 and the second magnet 561b is positioned between the second bent portion 5145 of the second plate-like portion 5142 of the external core portion 514 and the magnetic core 523 of the coil assembly 52.

The External Force is Applied

Figure 12B:
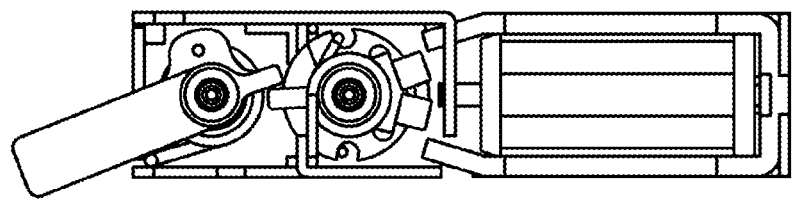
FIG. 12B is the top view of the power generator in a state that the operation member is pivotally moved in the clockwise direction (a first direction) around a first axis by external force applied to the operation member through the tongue guiding and discharging member and an engagement portion of the operation member is engaged with an engagement portion of the rotating member.

FIG. 12B shows the top view of the power generator 5 in a state that the operation member 53 is pivotally moved in the clockwise direction (a first direction) in FIG. 12B around the first axis 542a by the external force applied to the operation member 53 through the tongue guiding and discharging member 41 and the engagement portion 534 of the operation member 53 is engaged with the engagement portion 556 of the rotating member 55.

When the tongue 200 is inserted into the main body 2, the contact portion 412 of the tongue guiding and discharging member 41 contacting with the operation member 53 pushes the operation member 53 and thus the external force is applied to the operation member 53 so as to pivotally move the operation member 53 from the predetermined initial position in the clockwise direction in the plane parallel to the insertion direction of the tongue 200. As a result, the operation member 53 is pivotally moved in the clockwise direction in FIG. 12B around the first axis 542a. When the operation member 53 is pivotally moved in the clockwise direction, the engagement portion 534 of the operation member 53 is engaged with the engagement portion 556 of the rotating member 55. As a result, the rotating member 55 is rotated in the counter-clockwise direction around the second axis 542b by the operation member 53. At this time, the magnets 561a, 561b attached to the rotating member 55 are also relatively rotated and moved with respect to the coil 522 in the counter-clockwise direction around the second axis 542b.

The engagement between the engagement portion 534 of the operation member 53 and the engagement portion 556 of the rotating member 55 is kept until the magnets 561a, 561b attached to the rotating member 55 reach a first engagement release position due to the rotational movement. When the rotating member 55 is rotated, the upper torsion spring 57a and the lower torsion spring 57b supporting the rotating member 55 are elastically deformed, and thereby the applied external force is stored in the upper torsion spring 57a and the lower torsion spring 57b as the elastic energy. Further, at this time, the torsion spring 58 supporting the operation member 53 is also elastically deformed, and thereby the applied external force is stored in the torsion spring 58 as the elastic energy.

In this regard, when the operation member 53 is pivotally moved in the clockwise direction by the external force applied through the tongue guiding and discharging member 41, the magnets 561a, 561b are relatively rotated and moved with respect to the coil 522 and thus the density of the magnetic flux passing through the coil 522 varies. However, since a speed of the rotational movement of the magnets 561a, 561b due to the external force applied through the tongue guiding and discharging member 41 is slower than a time scale of an electromagnetic phenomenon and is not stable, an amount of the electric power generated in the coil 522 by this rotational movement is significantly small. Thus, the electromotive voltage generated in the coil 522 when the magnets 561a, 561b are relatively rotated and moved with respect to the coil 522 by the external force applied through the tongue guiding and discharging member 41 does not substantially contribute to the amount of the electric power generated by the power generator 5.

The Engagement is Released and the First Power Generation is Started

Figure 12C:
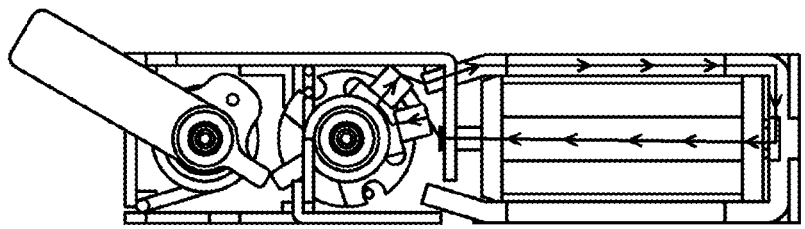
FIG. 12C is the top view of the power generator when magnets attached to the rotating member reach a first engagement release position and engagement between the engagement portion of the operation member and the engagement portion of the rotating member is released.

FIG. 12C shows the top view of the power generator 5 when the magnets 561a, 561b attached to the rotating member 55 reach the first engagement release position and the engagement between the engagement portion 534 of the operation member 53 and the engagement portion 556 of the rotating member 55 is released for starting the first power generation.

When the tongue 200 is inserted into the main body 2 and reaches the predetermined position in the main body 2, the tongue 200 is locked by the locking member 3. At this time, the magnets 561a, 561b attached to the rotating member 55 reach the first engagement release position and the engagement between the engagement portion 534 of the operation member 53 and the engagement portion 556 of the rotating member 55 is released, and thereby the first power generation is started.

When the engagement between the engagement portion 534 of the operation member 53 and the engagement portion 556 of the rotating member 55 is released, the elastic energy stored in the upper torsion spring 57a and the lower torsion spring 57b is released to rapidly rotate the rotating member 55 in the clockwise direction around the second axis 542b. At this time, the magnets 561a, 561b attached to the rotating member 55 are also rapidly rotated and moved with respect to the coil 522 in the clockwise direction around the second axis 542b. In this regard, after the engagement between the engagement portion 534 of the operation member 53 and the engagement portion 556 of the rotating member 55 is released, the lock of the tongue 200 due to the locking member 3 is kept and the operation member 53 is not pivotally moved until the lock of the tongue 200 is released.

In the state shown in FIG. 12C, the magnetic circuit is formed by the second magnet 561b, the external core portion 514 (the second plate-like portion 5142 and the connecting portion 5143), the magnetic core 523, the first magnet 561a and the yoke 562. In the state shown in FIG. 12C, the lines of magnetic force flowing in the magnetic circuit in the clockwise direction pass through the coil 522 from the right side to the left side.

Further, when the first magnet 561a takes a closest position with respect to the magnetic core 523 (the coil 522) of the coil assembly 52, a right-side end surface (a south pole plane) of the first magnet 561a approximately horizontally faces a left-side end surface of the magnetic core 523 of the coil assembly 52. On the other hand, when the second magnet 561b takes a closest position with respect to the second bent portion 5145, a right-side end surface (a north pole plane) of the second magnet 561b faces a left-side end surface of the second bent portion 5145. With this configuration, diffusion of the lines of magnetic force between the first magnet 561a and the magnetic core 523 of the coil assembly 52 and between the second magnet 561b and the second bent portion 5145 is prevented. Thus, it is possible to improve efficiency of the power generation of the power generator 5.

The First Power Generation Finishes

Figure 12D:
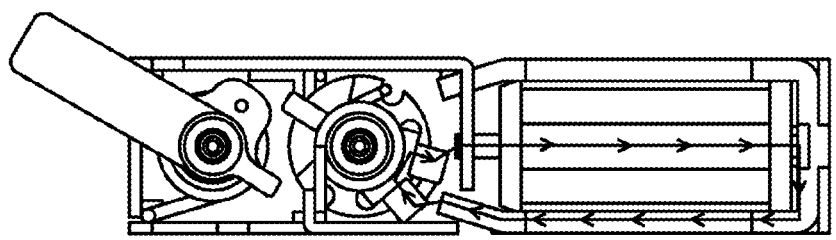
FIG. 12D is the top view of the power generator at the time when first power generation of the power generator finishes.

FIG. 12D shows the top view of the power generator 5 at the time when the first power generation of the power generator 5 finishes.

When the rotating member 55 is rotated in the clockwise direction in the state shown in FIG. 12C, the power generator 5 shifts to a state shown in FIG. 12D. When the power generator 5 shifts to the state shown in the FIG. 12D, the first power generation of the power generator 5 substantially finishes.

In the state shown in FIG. 12D, the magnetic circuit is formed by the second magnet 561b, the magnetic core 523, the external core portion 514 (the connecting portion 5143 and the first plate-like portion 5141), the first magnet 561a and the yoke 562. In the state shown in FIG. 12D, the lines of magnetic force flowing in the magnetic circuit in the clockwise direction pass through the coil 522 from the left side to the right side. Since the lines of magnetic force pass through the coil 522 from the right side to the left side in the state shown in FIG. 12C, a direction of the lines of magnetic force passing through the coil 522 is inverted in a first power generating zone in which the power generator 5 shifts from the state shown in FIG. 12C to the state shown in FIG. 12D. Thus, it is possible to sufficiently increase the variation of the density of the magnetic flux passing through the coil 522 in the first power generating zone of the power generator 5.

Further, when the first magnet 561a takes a closest position with respect to the first bent portion 5144, the right-side end surface (the south pole plane) of the first magnet 561a faces a left-side end surface of the first bent portion 5144. On the other hand, when the second magnet 561b takes a closest position with respect to the magnetic core 523 (the coil 522), the right-side end surface (the north pole plane) of the second magnet 561b approximately horizontally faces the left-side end surface of the magnetic core 523. With this configuration, diffusion of the lines of magnetic force between the first magnet 561a and the first bent portion 5144 and between the second magnet 561b and the magnetic core 523 of the coil assembly 52 is prevented. Thus, it is possible to improve the efficiency of the power generation of the power generator 5.

Figure 13A:
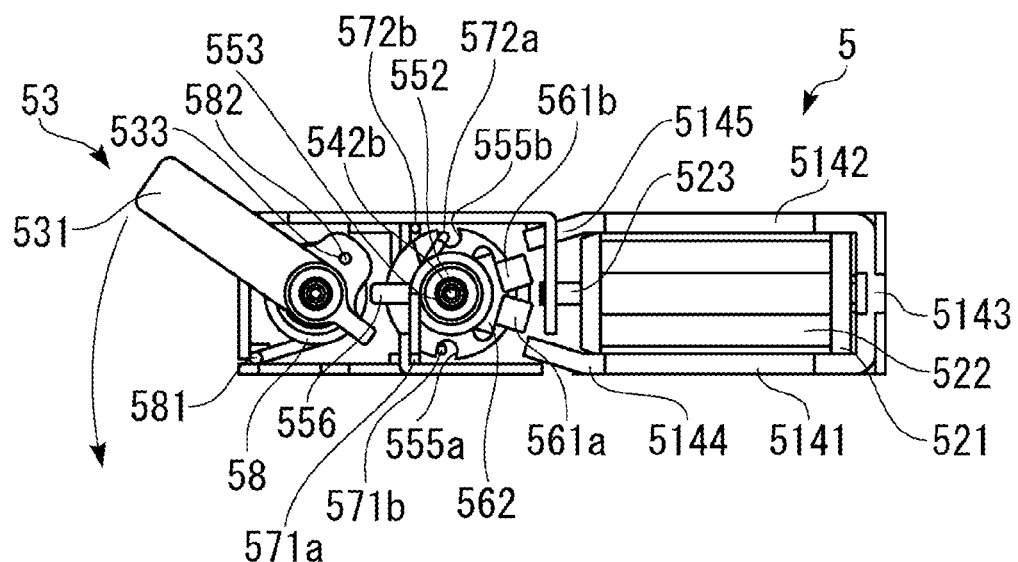
FIG. 13A is the top view of the power generator in a state that the first power generation finishes.

FIG. 13A shows the top view of the power generator 5 after the state shown in FIG. 12D, that is in a state that the first power generation finishes. When the first power generation finishes, the rotating member 55 is rotated in the counter-clockwise direction by the upper torsion spring 57a and the lower torsion spring 57b and the rotating member 55 returns to the initial state. In this state, the lock of the tongue 200 due to the locking member 3 is kept and the elastic energy remains in the torsion spring 58 supporting the operation member 53.

Re-Engagement

Figure 13B:
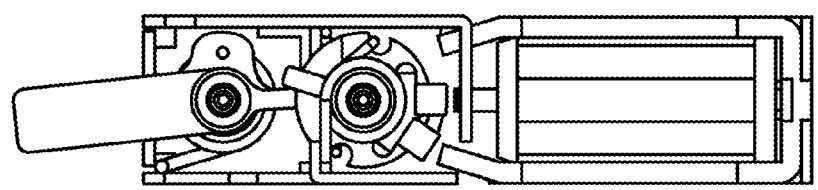
FIG. 13B is the top view of the power generator in a state that the engagement portion of the operation member is again engaged with the engagement portion of the rotating member after the lock of the tongue due to the locking member is released.

FIG. 13B shows the top view of the power generator 5 in a state that the engagement portion 534 of the operation member 53 is again engaged with the engagement portion 556 of the rotating member 55 after the lock of the tongue 200 due to the locking member 3 is released.

After the rotating member 55 returns to the initial state, the lock of the tongue 200 due to the locking member 3 is released. When the lock of the tongue 200 due to the locking member 3 is released and the tongue 200 is discharged from the main body 2 by the tongue guiding and discharging member 41, the elastic energy stored in the torsion spring 58 is released to pivotally move the operation member 53 in the counter-clockwise direction (a second direction) so as to return to the operation member 53 to the predetermined initial position and thus the engagement portion 534 of the operation member 53 is again engaged with the engagement portion 556 of the rotating member 55. As a result, the power generator 5 shifts to a state shown in FIG. 13B.

In the power generator 5, spring constants of the torsion spring 58, the upper torsion spring 57a and the lower torsion spring 57b and the shapes of the operation member 53 and the rotating member 55 are adjusted so that rotary torque applied from the operation member 53 to the rotating member 55 is larger than rotary torque applied from the rotating member 55 to the operation member 53 in the state shown in FIG. 13B.

In the state shown in FIG. 13B, the rotary torque applied from the operation member 53 to the rotating member 55 is larger than the rotary torque applied from the rotating member 55 to the operation member 53. Thus, after the engagement portion 534 of the operation member 53 is again engaged with the engagement portion 556 of the rotating member 55, the operation member 53 is pivotally moved in the counter-clockwise direction around the first axis 542a and thus the rotating member 55 is rotated in the clockwise direction around the second axis 542b by the operation member 53. At this time, the magnets 561a, 561b attached to the rotating member 55 are also relatively rotated and moved with respect to the coil 522 in the clockwise direction (the second direction) around the second axis 542b.

The engagement between the engagement portion 534 of the operation member 53 and the engagement portion 556 of the rotating member 55 is kept until the magnets 561a, 561b attached to the rotating member 55 reach a second engagement release position due to the rotational movement. In this regard, a magnitude relationship between the rotary torque applied from the operation member 53 to the rotating member 55 and the rotary torque applied from the rotating member 55 to the operation member 53 is kept until the magnets 561a, 561b reach the second engagement release position due to the rotational movement.

As is the same with the first power generation, when the rotating member 55 is rotated, the upper torsion spring 57a and the lower torsion spring 57b supporting the rotating member 55 are elastically deformed, and thereby the applied external force is stored in the upper torsion spring 57a and the lower torsion spring 57b as the elastic energy.

When the rotating member 55 is rotated in the clockwise direction by the operation member 53, the magnets 561a, 561b are relatively rotated and moved with respect to the coil 522 and thus the density of the magnetic flux passing through the coil 522 varies. However, since the speed of the rotational movement of the magnets 561a, 561b due to the operation member 53 is slower than the time scale of the electromagnetic phenomenon, an amount of the electric power generated in the coil 522 by this rotational movement is significantly small. Thus, the electromotive voltage generated in the coil 522 when the magnets 561a, 561b are relatively rotated and moved with respect to the coil 522 by the operation member 53 does not substantially contribute to the amount of the electric power generated by the power generator 5.

The Engagement is Released and the Second Power Generation is Started

Figure 13C:
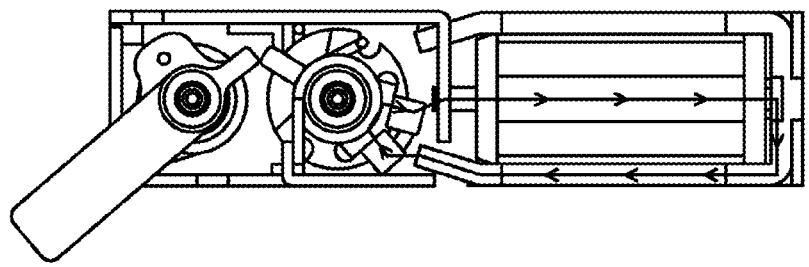
FIG. 13C is the top view of the power generator when the magnets attached to the rotating member reach a second engagement release position due to rotational movement and the engagement between the engagement portion of the operation member and the engagement portion of the rotating member is again released.

FIG. 13C shows the top view of the power generator 5 when the magnets 561a, 561b attached to the rotating member 55 reach the second engagement release position due to the rotational movement and the engagement between the engagement portion 534 of the operation member 53 and the engagement portion 556 of the rotating member 55 is again released.

When the engagement between the engagement portion 534 of the operation member 53 and the engagement portion 556 of the rotating member 55 is again released, the elastic energy stored in the upper torsion spring 57a and the lower torsion spring 57b is released to rapidly rotate the rotating member 55 in the counter-clockwise direction around the second axis 542b. At this time, the magnets 561a, 561b attached to the rotating member 55 are also rapidly rotated and moved with respect to the coil 522 in the counter-clockwise direction around the second axis 542b. Further, when the engagement between the engagement portion 534 of the operation member 53 and the engagement portion 556 of the rotating member 55 is again released, the operation member 53 is pivotally moved by the torsion spring 58 and thus the operation member 53 returns to the predetermined initial position.

In the state shown in FIG. 13C, the magnetic circuit is formed by the second magnet 561b, the magnetic core 523, the external core portion 514 (the connecting portion 5143 and the first plate-like portion 5141), the first magnet 561a and the yoke 562. In the state shown in FIG. 13C, the lines of magnetic force flowing in the magnetic circuit in the clockwise direction pass through the coil 522 from the left side to the right side.

The Second Power Generation Finishes

Figure 13D:
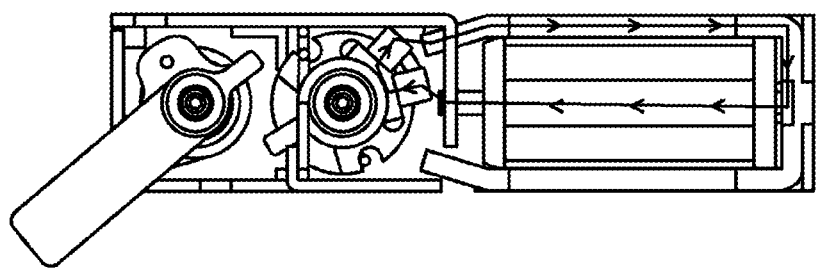
FIG. 13D is the top view of the power generator at the time when second power generation of the power generator finishes.

FIG. 13D shows the top view of the power generator 5 at the time when the second power generation of the power generator 5 finishes.

When the rotating member 55 is rotated in the counter-clockwise direction in the state shown in FIG. 13C, the power generator 5 shifts to a state shown in FIG. 13D. When the power generator 5 shifts to the state shown in the FIG. 13D, the second power generation of the power generator 5 substantially finishes.

In the state shown in FIG. 13D, the magnetic circuit is formed by the second magnet 561b, the external core portion 514 (the second plate-like portion 5142 and the connecting portion 5143), the magnetic core 523, the first magnet 561a and the yoke 562. In the state shown in FIG. 13D, the lines of magnetic force flowing in the magnetic circuit in the clockwise direction pass through the coil 522 from the right side to the left side. Since the lines of magnetic force pass through the coil 522 from the left side to the right side in the state shown in FIG. 13C, the direction of the lines of magnetic force passing through the coil 522 is inverted in a second power generating zone in which the power generator 5 shifts from the state shown in FIG. 13C to the state shown in FIG. 13D. Thus, it is possible to sufficiently increase the variation of the density of the magnetic flux passing through the coil 522 in the second power generating zone of the power generator 5.

After the state shown in FIG. 13D, the rotating member 55 is rotated in the clockwise direction by the upper torsion spring 57a and the lower torsion spring 57b and thus the rotating member 55 returns to the initial state.

As described above, when the tongue 200 is inserted into the main body 2 and discharge from the main body, the power generator 5 can perform the first power generation and the second power generation by utilizing the applied external force by utilizing the external force applied to the operation member 53 through the contact portion 412 of the tongue guiding and discharging member 41.

Further, in the power generator 5, the rotational direction of the magnets 561a, 561b at the first power generation performed when the tongue 200 is inserted into the main body 2 and the tongue 200 is locked by the locking member 3 is opposite to the rotational direction of the magnets 561a, 561b at the second power generation performed when the lock of the tongue 200 due to the locking member 3 is released and the tongue 200 is discharged from the main body 2. As a result, positive and negative of the electromotive voltage generated in the coil 522 at the first power generation are different from positive and negative of the electromotive voltage generated in the coil 522 at the second power generation. Thus, by determining that the electromotive voltage generated in the coil 522 is positive or negative, it is possible to determine whether the tongue 200 is inserted into the main body 2 and locked by the locking member 3 or the lock of the tongue 200 due to the locking member 3 is released and the tongue 200 is discharged from the main body 2.

Motion of the Locking Device 1

Figure 14A:
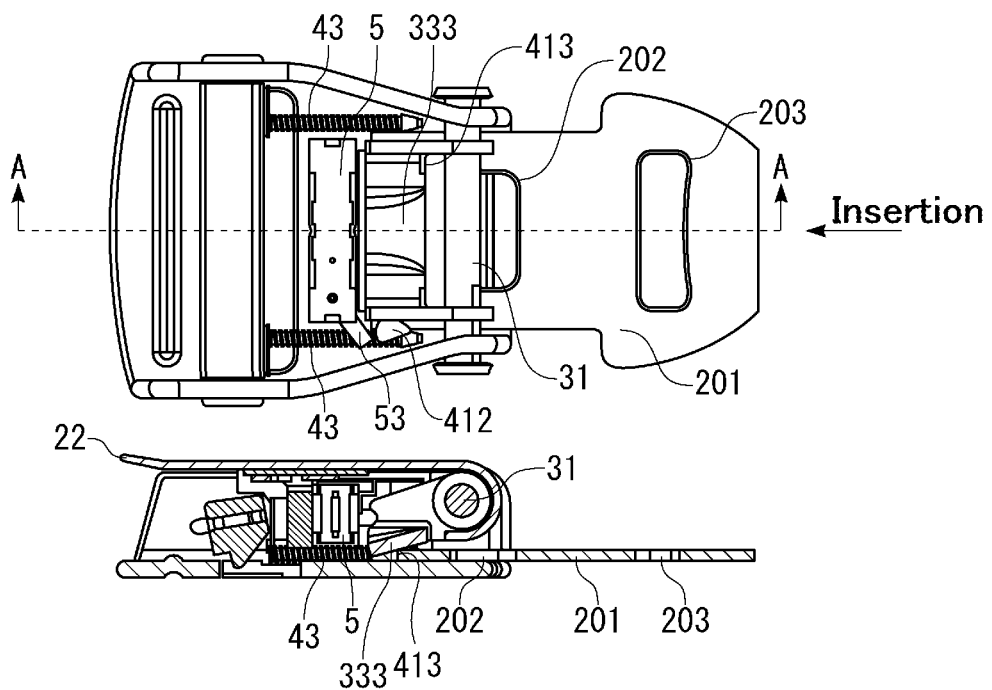
FIG. 14A is a view for explaining motion when the tongue is inserted into the locking device shown in FIG. 2.
Figure 14B:
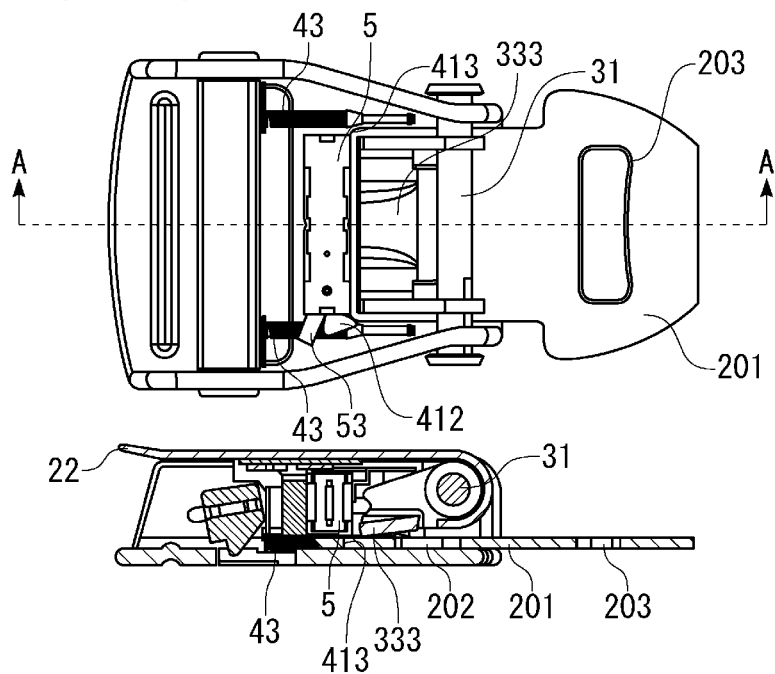
FIG. 14B is a view for explaining motion when the operation member of the power generator is pivotally moved in the locking device shown in FIG. 2.
Figure 14C:
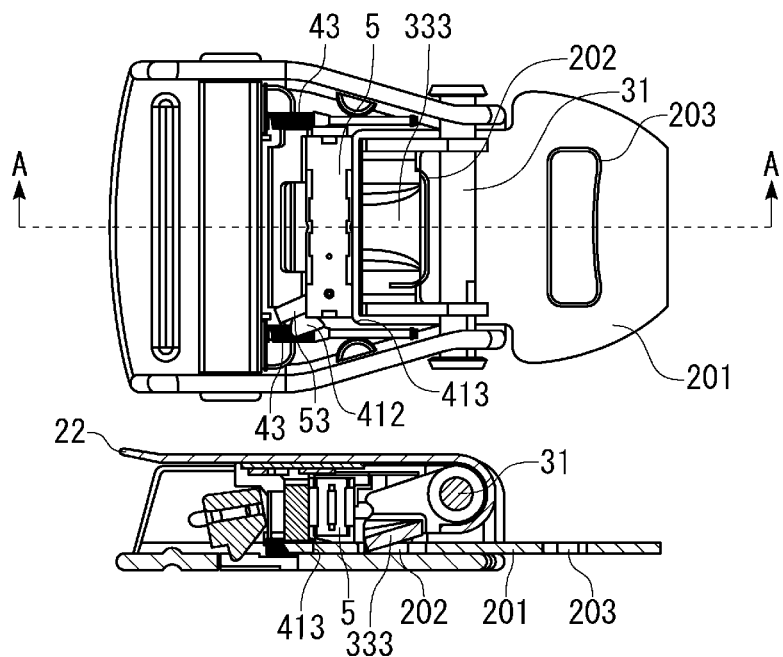
FIG. 14C is a view for explaining motion when the tongue is locked and the first power generation is performed in the locking device shown in FIG. 2.
Figure 14D:
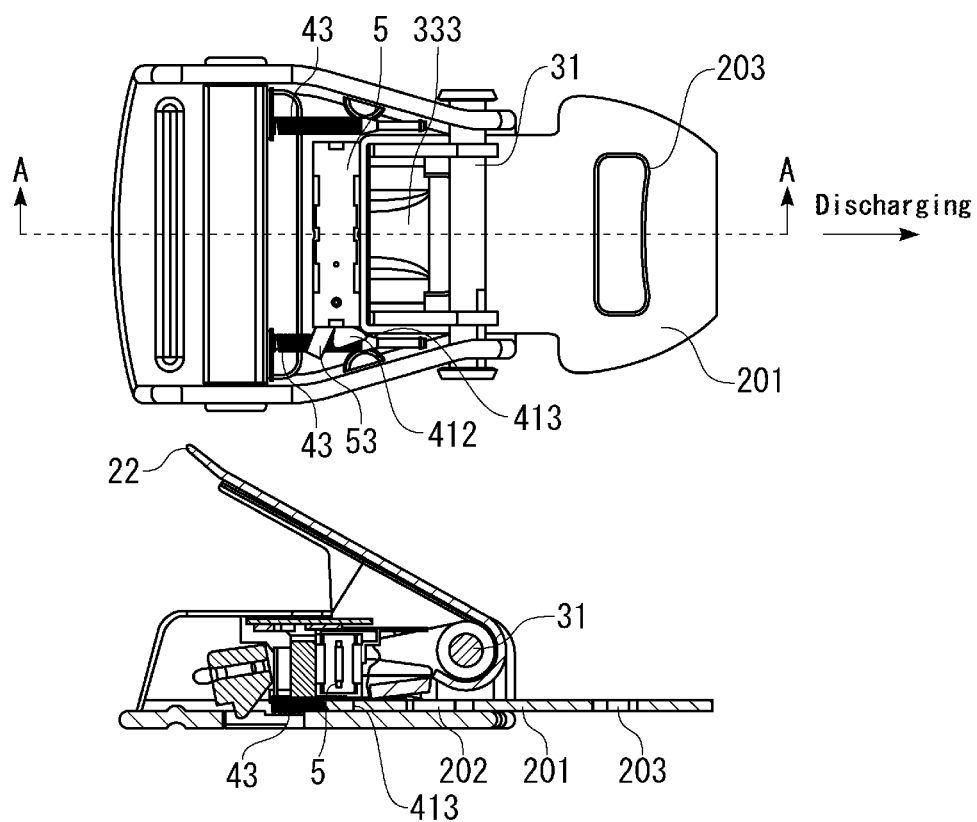
FIG. 14D is a view for explaining motion when the lock of the tongue is released and the tongue is discharged from the locking device shown in FIG. 2.
Figure 14E:
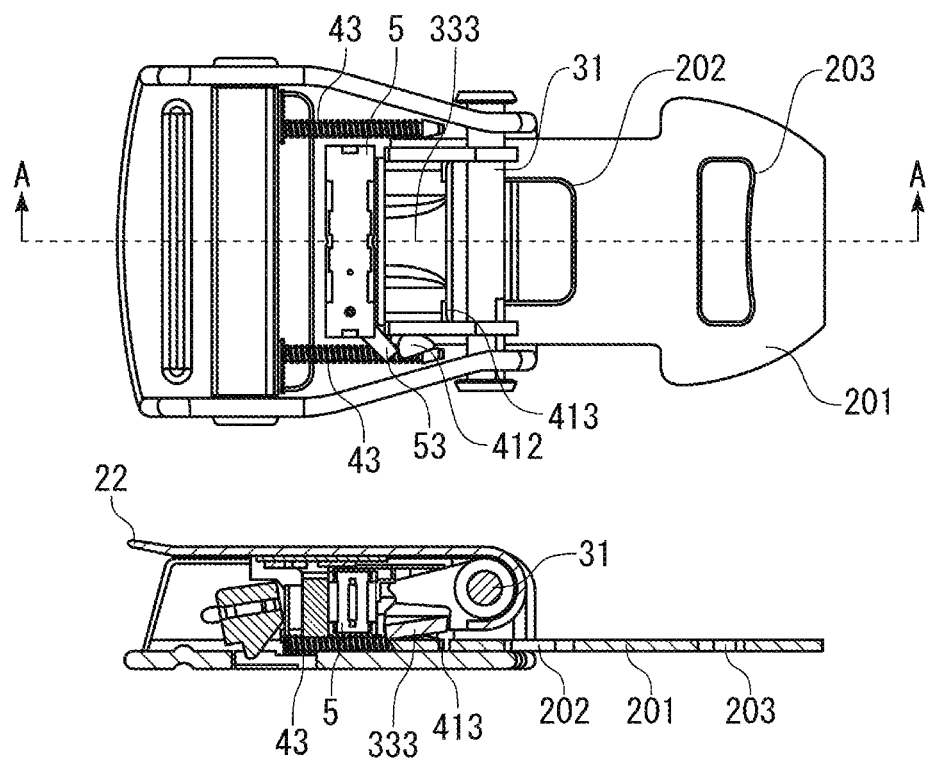
FIG. 14E is a view for explaining motion when the tongue is discharged and the second power generation is performed in the locking device shown in FIG. 2.

Next, motion of the locking device 1 of the present invention will be described in detail with reference to FIGS. 14A to 14E. FIG. 14A is a view for explaining motion when the tongue is inserted into the locking device shown in FIG. 2. FIG. 14B is a view for explaining motion when the operation member of the power generator is pivotally moved in the locking device shown in FIG. 2. FIG. 14C is a view for explaining motion when the tongue is locked and the first power generation is performed in the locking device shown in FIG. 2. FIG. 14D is a view for explaining motion when the lock of the tongue is released and the tongue is discharged from the locking device shown in FIG. 2. FIG. 14E is a view for explaining motion when the tongue is discharged and the second power generation is performed in the locking device shown in FIG. 2.

Each of FIGS. 14A to 14E contains a top view of the locking device 1 and a cross-sectional view taken along an A-A line in the top view. Further, for the purpose of illustrating the internal configuration of the locking device 1, the lock releasing operation member 22 serving as the cover for the main body 2 of the locking device 1 and the wireless transmitting part 7 are omitted in the top view of each of FIGS. 14A to 14E.

Insertion of Tongue 200 is Started

FIG. 14A shows the top view of the locking device 1 and the tongue 200 when the tongue 200 is inserted into the main body 2 of the locking device 1 through the tongue insertion port 23.

When the tongue 200 is inserted into the main body 2 of the locking device 1 through the tongue insertion port 23, the tip end portion of the tongue 200 is engaged with the tongue receiving concave portion 413 of the tongue guiding and discharging member 41 and the tongue 200 is guided by the tongue guiding and discharging member 41.

When the tongue 200 is guided by the tongue guiding and discharging member 41 and inserted into the main body 2, the tip end portion of the tongue 200 makes contact with the lower surface of the engagement portion 333 of the locking member 3, and thereby the pivotally moving portion 33 of the locking member 3 is pivotally moved and pushed up around the pivotal movement shaft 31.

The Pivotal Movement of the Operation Member 53 of the Power Generator 5 is Started When the tongue 200 is further inserted into the main body 2 in the state shown in FIG. 14A, the power generator 5 shifts to a state shown in FIG. 14B.

The pivotally moving portion 33 of the locking member 3 is further pushed up by the tongue 200 from the state shown in FIG. 14A and the engagement portion 333 of the pivotally moving portion 33 of the locking member 3 is positioned on the plate-like portion 201 of the tongue 200.

Further, since the tongue guiding and discharging member 41 is slid in the insertion direction of the tongue 200 by the tongue 200, the contact portion 412 of the tongue guiding and discharging member 41 contacting with the operation member 53 of the power generator 5 pushes the operation member 53 of the power generator 5. As a result, the operation member 53 of the power generator 5 is pivotally moved from the predetermined initial position in the first direction in the plane parallel to the insertion direction of the tongue 200. Further, the coil springs 44 of the tongue guiding and discharging mechanism 4 are elastically deformed due to the sliding movement of the tongue guiding and discharging member 41 in the insertion direction of the tongue 200.

The Tongue 200 is Locked and the First Power Generation is Performed

When the tongue 20 is further inserted into the main body 2 in the state shown in FIG. 14B and the tongue 200 is locked by the locking member 3, the power generator 5 shifts to a state shown in FIG. 14C.

As a result that the tongue 200 is further inserted into the main body 2, the engagement portion 333 of the pivotally moving portion 33 of the locking member 3 on the plate-like portion 201 of the tongue 200 is inserted into the engagement hole 202 of the tongue 200, and thereby the tongue 200 is locked by the locking member 3.

Further, the operation member 53 of the power generator 5 is further pivotally moved by the contact portion 412 of the tongue guiding and discharging member 41 from the state shown in FIG. 14B. At this time, the power generator 5 shifts to the state described with reference to FIG. 12C and performs the first power generation. When the power generator 5 performs the first power generation, the wireless transmitting part 7 is driven by the electric power generated by the power generator 5. At this time, the wireless transmitting part 7 identifies the positive and negative of the electromotive voltage generated in the coil 522 to determine that the tongue 200 is inserted into the main body 2 and locked by the locking member 3 and wirelessly transmits a signal indicating that the tongue 200 is locked by the locking device 1 to the external device such as a management device.

The Lock of the Tongue 200 is Released and the Discharging of the Tongue 200 is Started When the lock releasing operation member 22 of the locking device 1 is pivotally operated after the tongue 200 has been locked by the locking member 3, the power generator 5 shifts to a state shown in FIG. 14D.

When the lock releasing operation member 22 is pivotally moved toward the upper side around the pivotal movement shaft 31 of the locking member 3, the engagement portion 225 of the lock releasing operation member 22 is engaged with the pivotally moving portion 33 of the locking member 3. At this time, the pivotally moving portion 33 of the locking member 3 is pushed up and pivotally moved by the lock releasing operation member 22. As a result, the engagement portion 333 of the pivotally moving portion 33 of the locking member 3 is left from the engagement hole 202 of the tongue 200, and thereby the lock of the tongue 200 due to the locking member 3 is released.

When the lock of the tongue 200 due to the locking member 3 is released, the coil springs 44 of the tongue guiding and discharging mechanism 4 are elastically restored to slide the tongue guiding and discharging member 41 in the discharging direction of the tongue 200, and thereby the tongue 200 is discharged from the main body 2 of the locking device 1.

Further, when the tongue guiding and discharging member 41 is slid in the discharging direction of the tongue 200 and the tongue 200 is discharged from the main body 2, the operation member 53 of the power generator 5 is pivotally moved in the second direction in the plane parallel to the insertion direction of the tongue 200 due to the action of the torsion spring 58 of the power generator 5. As a result, the operation member 53 returns to the predetermined initial position.

The Tongue 200 is Discharged and the Second Power Generation is Performed

When the tongue 200 is further discharged from the main body 2 in the state shown in FIG. 14D, the power generator 5 shifts to a state shown in FIG. 14E.

In the state shown in FIG. 14E, the tongue 200 is further discharged from the main body 2 by the tongue guiding and discharging member 41. Further, the operation member 53 of the power generator 5 is further pivotally moved from the state shown in FIG. 14D. At this time, the power generator 5 shifts to the state described with reference to FIG. 13C and performs the second power generation. When the power generator 5 performs the second power generation, the wireless transmitting part 7 is driven by the electric power generated by the power generator 5. At this time, the wireless transmitting part 7 identifies the positive and negative of the electromotive voltage generated in the coil 522 to determine that the lock of the tongue 200 is released and discharged from the main body 2 of the locking device 1 and wirelessly transmits a signal indicating that the lock of the tongue 200 is released and the tongue 200 is discharged from the main body 2 of the locking device 1 to the external device such as a management device.

As described above, in the locking device 1 of the present invention, the operation member 53 of the power generator 5 is pivotally moved in the plane parallel to the insertion direction of the tongue 200 by utilizing the horizontal movement caused by the insertion of the tongue 200 into the main body 2 of the locking device 1 and the discharging of the tongue 200 from the main body 2 of the locking device 1 to allow the power generator 5 to perform the first power generation and the second power generation and drive the wireless transmitting part 7.

Thus, in the locking device 1 of the present invention, it becomes unnecessary to ensure a space for converting the horizontal movement caused by the insertion of the tongue 200 into the main body 2 of the locking device 1 into pivotal movement in a plane perpendicular to the insertion direction of the tongue 200 unlike the above-described conventional art. Thus, it is possible to reduce a thickness of the locking device 1 of the present invention.

Further, in the locking device 1 of the present invention, the contact portion 412 is formed on the engagement portion 411 of the tongue guiding and discharging member 41 to enable the horizontal movement caused by the insertion of the tongue 200 into the main body 2 of the locking device 1 to be converted into the pivotal movement of the operation member 53 of the power generator 5.

Thus, in the locking device 1 of the present invention, additional assemblies are not required for pivotally moving the operation member 53 of the power generator 5 by utilizing the horizontal movement caused by the insertion of the tongue 200 into the main body 2 of the locking device 1 unlike the above-mentioned conventional art. Thus, the number of assemblies does not increase in the locking device 1 of the present invention for pivotally moving the operation member 53 of the power generator 5. Therefore, it is possible to simplify the configuration of the locking device 1 and reduce a cost of the locking device 1.

Further, the power generator 5 provided in the locking device 1 of the present invention performs the first power generation and the second power generation by utilizing mechanical energy caused at the time of inserting and discharging the tongue 200 and the wireless transmitting part 7 wirelessly transmits the signal with the electric power generated by the power generator 5. Thus, this allows the locking device 1 to be a battery-less device and it becomes unnecessary to perform a maintenance work such as a battery replacement work of the locking device 1. As described above, convenience of the locking device 1 including the power generator 5 which can generate the electric power by utilizing the movement at the time of inserting and discharging the tongue 200 and the wireless transmitting part 7 driven by the electric power generated by the power generator 5 is significantly high.

Although the locking device of the present invention has been described based on the embodiment shown in the accompanying drawings in the above description, the present invention is not limited thereto. The configuration of each component of the present invention may be possibly replaced with other arbitrary configurations having equivalent functions. Further, it may be also possible to add other arbitrary components to the configuration of the present invention.

Further, the number and the kinds of the components of the locking device of the present invention are merely provided for the illustration of the present invention, the present invention is not necessarily limited thereto. The scope of the present invention contains alternations and changes of the described configurations in which arbitrary constitutional components are added or combined or arbitrary constitutional components are omitted without meaningfully departing from the principle and the spirit of the present invention.

For example, although the wireless transmitting part 7 is provided in the main body 2 of the locking device 1 in the above-described embodiment, the present invention is not limited thereto. For example, an aspect in which the wireless transmitting part 7 is provided outside the main body 2 of the locking device 1 and the wireless transmitting part 7 is connected to the power lead wires extending from the power generator 5 to the outside directly or through other devices is also contained in the scope of the present invention.

Further, although the locking device 1 uses the lock releasing operation member 22 pivotally moved around the pivotal movement shaft 31 for releasing the lock of the tongue 200, the present invention is not limited thereto. For example, a push-button type lock releasing mechanism may be used in the locking device 1 for releasing the lock of the tongue 200.

Further, although the number of the magnets is two in the power generator 5 of the locking device 1, the present invention is not limited thereto. The number of the magnets used in the power generator 5 may be arbitrarily changed depending on some factors such as the spring constant of the elastic member, a power generation amount required for driving the wireless transmitting part 7 and strength of the magnetic force of the magnets.

For example, in a case where the power generation amount required for driving the wireless transmitting part 7 is small, the number of the magnets may be one. On the other hand, in a case where the amount of the electric power required for driving the power generation amount required for driving the wireless transmitting part 7 is large, the number of the magnets may be three or more. In the case where the number of the magnets is one, three or more, it is possible to use the coil, the magnetic core and the external core with the number corresponding to the number of the magnets in the power generator 5 of the locking device 1.

Further, although the torsion springs are used as the elastic member in the power generator 5 of the locking device 1, the present invention is not limited thereto. It is possible to use any elastic mechanism such as a spring having another configuration, a rubber and an air cylinder as the elastic member.

What it claimed is:

1. A locking device for locking a tongue, comprising:
   a main body having a tongue insertion port through which the tongue is inserted;
   a locking member for locking the tongue when the tongue reaches a predetermined position in the main body;
   a lock releasing operation member operated for releasing a lock of the tongue due to the locking member;
   a tongue guiding and discharging member provided in the main body so as to be slidably moved along an insertion direction of the tongue, wherein the tongue guiding and discharging member is slid along the insertion direction of the tongue in the main body to guide the tongue until the locking member locks the tongue when the tongue is inserted into the main body through the tongue insertion port and discharge the tongue from the main body when the lock of the tongue due to the locking member is released;
   a power generator fixedly provided in the main body, wherein the power generator has an operation member pushed by the tongue guiding and discharging member slid in the main body along the insertion direction of the tongue and pivotally moved in a plane parallel to the insertion direction of the tongue when the tongue is inserted into the main body, and wherein the power generator generates electric power by utilizing external force applied from the tongue guiding and discharging member through the operation member; and
   a wireless transmitting part driven by the electric power generated by the power generator.

2. The locking device as claimed in claim 1, wherein the operation member of the power generator is pushed by the tongue guiding and discharging member and pivotally moved from a predetermined initial position in a first direction in the plane parallel to the insertion direction of the tongue when the tongue is inserted into the main body, and
   wherein the operation member of the power generator is pivotally moved in a second direction opposite to the first direction in the plane parallel to the insertion direction of the tongue to return to the predetermined initial position when the lock of the tongue due to the locking member is released and the tongue is discharged from the main body.

3. The locking device as claimed in claim 2, wherein the power generator performs first power generation when the tongue is inserted into the main body and the locking member locks the tongue and performs second power generation when the lock of the tongue due to the locking member is released and the operation member of the power generator is pivotally moved in the second direction in the plane parallel to the insertion direction of the tongue to return to the predetermined initial position.

4. The locking device as claimed in claim 3, wherein positive and negative of an electromotive voltage generated in the power generator at the first power generation are different from positive and negative of an electromotive voltage generated in the power generator at the second power generation.

5. The locking device as claimed in claim 1, wherein the tongue guiding and discharging member has a plate-like engagement portion to be engaged with the tongue and a contact portion formed so as to protrude from an upper surface of the engagement portion,
   wherein the contact portion pushes the operation member of the power generator to pivotally move the operation member in the plane parallel to the insertion direction of the tongue when the tongue is inserted into the main body and the tongue guiding and discharging member is slid in the main body along the insertion direction of the tongue.

6. The locking device as claimed in claim 1, wherein the power generator further has a coil, a magnet provided so as to be relatively rotated and moved with respect to the coil around a predetermined rotational axis and an elastic member for storing the external force applied from the tongue guiding and discharging member through the operation member as elastic energy and releasing of the stored elastic energy to relatively rotate and move the magnet with respect to the coil.

7. The locking device as claimed in claim 6, wherein the power generator further has a rotating member which is engaged with the operation member and can be rotated due to pivotal movement of the operation member, and
   wherein the magnet is attached to the rotating member.

8. The locking device as claimed in claim 7, wherein the operation member is configured to be engaged with the rotating member while the magnet is rotated and moved to reach a first engagement release position due to rotation of the rotating member and release engagement with the rotating member when the magnet reaches the first engagement release position, and
   wherein the elastic member is configured to store the elastic energy while the magnet is rotated and moved due to the rotation of the rotating member and release the elastic energy to rotate and move the magnet when an engagement between the operation member and the rotating member is released for allowing the power generator to perform first power generation.

9. The locking device as claimed in claim 8, wherein the operation member can be pivotally moved to return to a predetermined initial position when the lock of the tongue due to the locking member is released after the engagement between the operation member and the rotating member is released.

10. The locking device as claimed in claim 9, wherein the operation member is configured to again engage with the rotating member to rotate and move the rotating member when the operation member is pivotally moved so as to return to the predetermined initial position, and
    wherein the operation member is configured to be engaged with the rotating member while the magnet is rotated and moved due to the rotation of the rotating member to reach a second engagement release position and again release the engagement with the rotating member when the magnet reaches the second engagement release position.

11. The locking device as claimed in claim 10, wherein the elastic member is configured to store the elastic energy while the operation member is pivotally moved so as to return to the predetermined initial position and the magnet is rotated and moved due to the rotation of the rotating member and release the elastic energy when the engagement between the operation member and the rotating member is again released to rotate and move the magnet for allowing the power generator to perform second power generation.

* * * * *